US009520915B2

(12) United States Patent
Sano et al.

(10) Patent No.: US 9,520,915 B2
(45) Date of Patent: Dec. 13, 2016

(54) RADIO COMMUNICATION SYSTEM, RADIO BASE STATION, AND MOBILE TERMINAL

(71) Applicant: NTT DOCOMO, INC., Chiyoda-ku (JP)

(72) Inventors: Yousuke Sano, Chiyoda-ku (JP);
Yusuke Ohwatari, Chiyoda-ku (JP);
Nobuhiko Miki, Chiyoda-ku (JP);
Akihito Morimoto, Chiyoda-ku (JP);
Yukihiko Okumura, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 5 days.

(21) Appl. No.: 14/232,139

(22) PCT Filed: Apr. 11, 2013

(86) PCT No.: PCT/JP2013/060960
§ 371 (c)(1),
(2) Date: Jan. 10, 2014

(87) PCT Pub. No.: WO2013/157482
PCT Pub. Date: Oct. 24, 2013

(65) Prior Publication Data
US 2015/0029951 A1    Jan. 29, 2015

(30) Foreign Application Priority Data
Apr. 17, 2012  (JP) ................. 2012-094172

(51) Int. Cl.
*H04W 4/00*     (2009.01)
*H04B 17/00*    (2015.01)
(Continued)

(52) U.S. Cl.
CPC ............... *H04B 1/62* (2013.01); *H04B 7/024* (2013.01); *H04J 11/005* (2013.01); *H04W 16/28* (2013.01);
(Continued)

(58) Field of Classification Search
CPC ........ H04B 1/62; H04B 7/0452; H04W 16/28; H04W 72/082
See application file for complete search history.

(56) References Cited

U.S. PATENT DOCUMENTS

2009/0016461 A1*  1/2009  Jitsukawa et al. ............ 375/267
2009/0310586 A1* 12/2009  Shatti ............................. 370/338
(Continued)

FOREIGN PATENT DOCUMENTS

EP    2 413 514 A1    2/2012
JP    2000 511370     8/2000

OTHER PUBLICATIONS

3GPP TSG RAN WG1 Meeting #64, R1-111031, "On advanced UE MMSE receiver modelling in system simulations", Nokia, Nokia Siemens Networkds, Agenda Item 6.3.1.3, Total 10 Pages, (Taipei, Taiwan, Feb. 21-25, 2011).

(Continued)

*Primary Examiner* — Man Phan
*Assistant Examiner* — Ryan Kavleski
(74) *Attorney, Agent, or Firm* — Oblon, McClelland, Maier & Neustadt, L.L.P.

(57) ABSTRACT

In a radio communication system including multiple mobile terminals and multiple radio base stations, the mobile terminal has a function of interference rejection combining. The radio base stations share downlink channel characteristics for mobile terminals connected to radio base stations. The radio base station gives weights to radio waves transmitted from multiple transmission antennas to perform in-phase addition of an interfering radio wave beam directed to a mobile terminal for which the desired radio base station is another radio base station to an interfering radio wave beam transmitted from yet another radio base station for limiting the number of interfering radio wave beams that arrive at the mobile terminal. The radio base station does not perform in-phase addition when the number of interfering radio wave beams of which interference can be suppressed by the mobile terminal is equal to or greater than the number of (Continued)

radio base stations that send interfering radio wave beams to the mobile terminal.

10 Claims, 8 Drawing Sheets

(51) Int. Cl.
| | | |
|---|---|---|
| *H04B 1/62* | (2006.01) | |
| *H04W 16/28* | (2009.01) | |
| *H04W 24/10* | (2009.01) | |
| *H04W 28/16* | (2009.01) | |
| *H04W 72/08* | (2009.01) | |
| *H04B 7/02* | (2006.01) | |
| *H04J 11/00* | (2006.01) | |
| *H04B 7/06* | (2006.01) | |
| *H04B 7/04* | (2006.01) | |
| *H04B 7/08* | (2006.01) | |

(52) U.S. Cl.
CPC ............ *H04W 24/10* (2013.01); *H04W 28/16* (2013.01); *H04W 72/082* (2013.01); *H04B 7/0452* (2013.01); *H04B 7/0617* (2013.01); *H04B 7/0626* (2013.01); *H04B 7/0628* (2013.01); *H04B 7/0645* (2013.01); *H04B 7/0854* (2013.01)

(56) References Cited

U.S. PATENT DOCUMENTS

| | | | |
|---|---|---|---|
| 2012/0008577 A1* | 1/2012 | Han et al. ................. | 370/329 |
| 2012/0177090 A1* | 7/2012 | Iwai et al. ................. | 375/219 |
| 2013/0286960 A1* | 10/2013 | Li et al. .................... | 370/329 |
| 2014/0241296 A1* | 8/2014 | Shattil .................. | H04B 7/026 |
| | | | 370/329 |

OTHER PUBLICATIONS

Thiele, L. et al., "On the Value of Synchronous Downlink MIMO-OFDMA Systems with Linear Equalizers", Fraunhofer Institute for Telecommunications, Heinrich-Hertz-Institut, pp. 428-432. (2008).
Cadambe, V. R. et al., "Interference Alignment and Degree of Freedom of the K-User Interference Channel", IEEE Transactions on Information Theory, vol. 54, No. 8, pp. 3425-3441, (Aug. 2008).
3GPP TR 36.819 V11.1.0, $3^{rd}$ Generation Partnership Project; Technical Specification Group Radio Access Network; Coordinated multi-point operation for LTE physical layer aspects (Release 11), pp. 1-69, (Dec. 201).
International Search Report Issued Jul. 9, 2013 in PCT/JP13/060960 Filed Apr. 11, 2013.
Extended European Search Report issued Nov. 11, 2015 in Patent Application 13779044.0.
"3rd Generation Partnership Project; Technical Specification Group Radio Access Network; Evolved Universal Terrestrial Radio Access (E-UTRA); Further advancements for E-UTRA physical layer aspects (Release 9)" 3GPP TR 36.814 V9.0.0, Mar. 2010, 104 Pages.

* cited by examiner

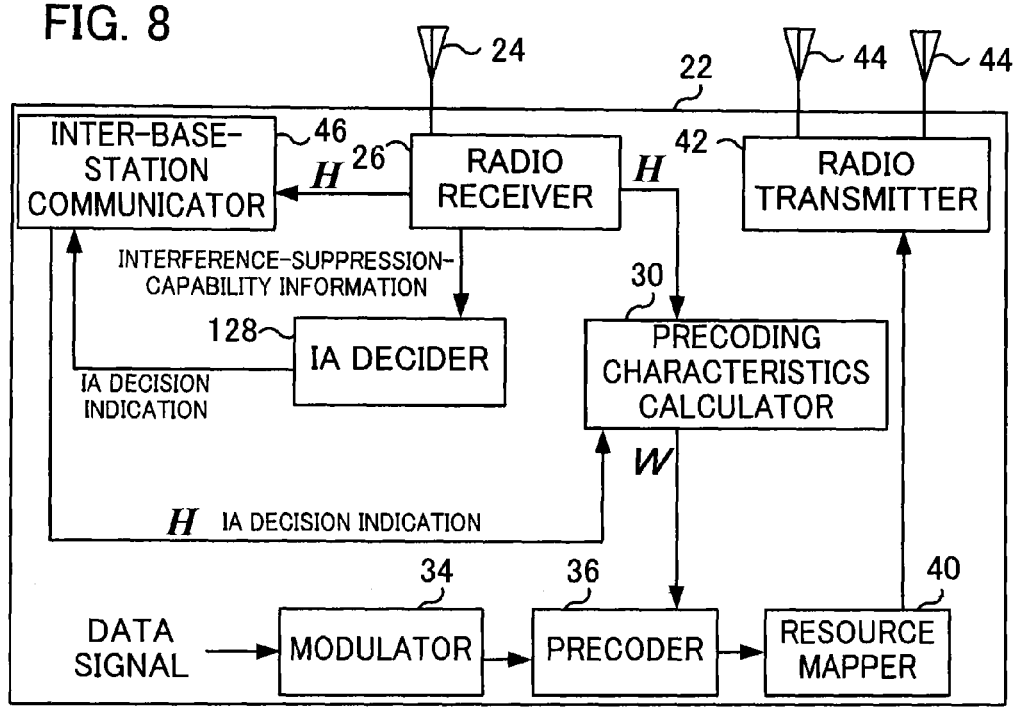
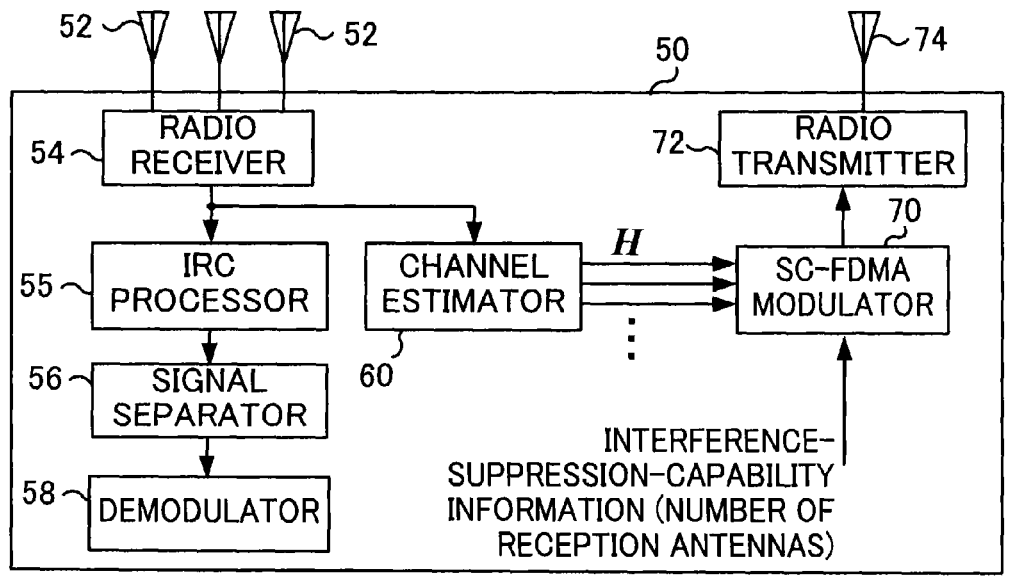

RADIO COMMUNICATION SYSTEM, RADIO BASE STATION, AND MOBILE TERMINAL

FIELD OF THE INVENTION

The present invention relates to a radio communication system, a radio base station, and a mobile terminal.

BACKGROUND ART

In the LTE (Long Term Evolution) Advanced of the 3GPP (Third Generation Partnership Project), OFDMA (Orthogonal Frequency Division Multiplexing Access) using MU-MIMO (multi-user multiple-input multiple-output) has been proposed. In MU-MIMO downlink transmission, a base station is able to not only communicate with multiple mobile terminals (UE, user equipments), but also to transmit different data streams (layers) simultaneously to a mobile terminal.

In addition, in LTE Advanced, a reception technique for mobile terminals called "interference rejection combining" has been discussed. Interference rejection combining (IRC) is a technique for downlink communication, in which a mobile terminal gives weights to signals obtained by reception antennas so as to suppress interference with the desired radio wave beam from the visited base station (desired base station) caused by interfering radio wave beams from interfering base stations at the mobile terminal. IRC improves the reception quality of desired signals on a desired radio wave beam, especially in a case in which a mobile terminal 4 is located near the boundary of a visited cell 1a (cell of the desired base station 1) and receives strong interfering radio wave beams from another base station 2 (interfering base station) as shown in FIG. 1. In FIG. 1, reference symbol 2a denotes the cell of the interfering base station 2. In addition, in FIG. 1, a general shape of a beam 1b generated at the desired base station 1, and a general shape of the beam 2b generated at the interfering base station 2 are illustrated. A part of the beam 2b generated at the interfering base station 2, i.e., a part of a beam for downlink channels for other mobile terminals (for example, a mobile terminal 5) causes an interfering signal for the mobile terminal 4.

IRC is described in, for example, Patent Document 1, Non-patent Document 1, and Non-patent Document 2. In IRC, the mobile terminal gives weights to multiple signals obtained by reception antennas so as to suppress interference with the desired radio wave beam caused by interfering radio wave beams, and separates a signal destined for the mobile terminal from signals destined for other mobile terminals among multiple signals derived from radio waves received at the multiple receiving antennas with the use of the reception weights.

In recent years, a technology has been proposed in which multiple radio base stations collaborate to adjust radio wave beams for controlling interfering radio wave beams received at mobile terminals. For example, Non-patent Document 3 discloses interference alignment (IA). In interference alignment, multiple radio base stations share downlink channel characteristic information on multiple mobile terminals, and multiple interfering base stations for each single mobile terminal coordinates to perform in-phase addition of interfering radio wave beams. As a result, the number of interfering radio wave beams arriving at the mobile terminal is reduced. The mobile terminal can eliminate or reduce the adverse effect of interference by, for example, using IRC.

Furthermore, 3GPP has discussed the application of a technology called Coordinated Multiple Point Transmission and Reception (CoMP) for LTE Advanced (see Clause 8, Non-Patent Document 4, for example).

Downlink CoMP is a technology in which multiple radio base stations coordinate with each other in order to send data signals to mobile terminals. Downlink CoMP is roughly divided into Coordinated Scheduling/Beamforming (CS/CB) and Joint Processing (JP).

In JP in downlink CoMP, multiple coordinating radio base stations share data signals destined for all UEs connected to these radio base stations, in addition to channel quality information and the like. These radio base stations mutually coordinate to send the data signals to the UEs. For example, two or three radio base stations send data signals to a single UE at the same time.

In CS/CB in downlink CoMP, a data signal exists only in a transmission-source radio base station to which a transmission-destination mobile terminal is connected. In CS/CB, however, information (channel quality information and the like) about all mobile terminals connected to a radio base station serving as the data-signal transmission source, and to one or more other radio base stations that coordinate with the radio base station, is shared by these radio base stations, and these radio base stations mutually coordinate to perform scheduling or beam forming in order to send a data signal to each mobile terminal. In other words, each of a plurality of coordinating radio base stations sends data signals to mobile terminals in the cell of the radio base station, and the plurality of coordinating radio base stations share channel quality information and the like related to the mobile terminals in order to perform appropriate scheduling or appropriate beam forming for data transmission.

In CS/CB in downlink CoMP, beam forming has been proposed in which a radio base station directs main beams to mobile terminals to which data signals are sent, and directs nulling beams to mobile terminals that communicate with other radio base stations. For this purpose, multiple radio base stations share downlink channel characteristic information of multiple mobile terminals. As a result, each mobile terminal receives a strong desired radio wave beam from its desired radio base station and weak interfering radio wave beams from interfering radio base stations.

RELATED ART DOCUMENTS

Patent Documents

Patent Document 1: JP-A-2000-511370

Non-Patent Documents

Non-patent Document 1: R1-111031, 3GPP TSG RAN WG1 Meeting #64, Taipei, Taiwan, 21-25 Feb. 2011, Agenda item: 6.3.1.3, Source: Nokia, Nokia Siemens Networks, Title: "On advanced UE MMSE receiver modelling in system simulations", Document for: Discussion and Decision Non-patent Document 2: Lars Thiele et al, "On the Value of Synchronous Downlink MIMO-OFDMA Systems with Linear Equalizers", Fraunhofer Institute for Telecommunications, Heinrich-Hertz-Institut Einsteinufer 37, 10587 Berlin, Germany Non-patent Document 3: Viveck R. Cadambe et al, "Interference Alignment and Degrees of Freedom of the K-User Interference Channel", IEEE TRANSACTIONS ON INFORMATION THEORY, VOL. 54, NO. 8, AUGUST 2008

Non-patent Document 4: 3GPP TR 36.814 V9.0.0 (2010-03), 3rd Generation Partnership Project; Technical Specification Group Radio Access Network; Evolved Universal Terrestrial Radio Access (E-UTRA); "Further advancements for E-UTRA physical layer aspects", March 2010

SUMMARY OF THE INVENTION

Let us assume that mobile terminals adapted for IRC are used in a radio communication system in which multiple radio base stations collaborate to adjust radio wave beams for controlling interfering radio wave beams received at mobile terminals with the use of IA or CS/CB described above. It is normally expected that interference suppression effects at the mobile terminals will be highly enhanced and reception quality will be improved in this case.

However, radio base stations need not necessarily collaborate to control interfering radio wave beams for mobile terminals that can inherently ensure good reception quality by virtue of its high interference suppression capability by IRC. Rather, if radio base stations collaborate to control interfering radio wave beams for such mobile terminals, it will be predicted that efficiency of processing in the overall radio communication system may be decreased.

Accordingly, the present invention provides a technology that can enhance efficiency of processing in an overall radio communication system in which radio base stations can collaborate to control interfering radio wave beams and mobile communication terminals have interference suppression capability.

According to a first aspect of the present invention, there is provided a radio communication system including multiple mobile terminals and multiple radio base stations communicating with the mobile terminals by radio. Each of the multiple mobile terminals includes: multiple reception antennas for receiving radio waves; an interference rejection combining processor adapted for giving weights to multiple signals obtained by the multiple reception antennas so as to suppress interference with a desired radio wave beam from a desired base station caused by interfering radio wave beams from interfering base stations; a signal separator adapted for separating a signal destined for the mobile terminal from signals destined for other mobile terminals among signals derived from radio waves received at the multiple receiving antennas with the use of the reception weights calculated at the interference rejection combining processor; channel estimator adapted for calculating downlink channel characteristics from the multiple radio base stations to the mobile terminal; a channel characteristics transmitter adapted for imparting channel characteristic information that indicates the channel characteristics calculated by the channel estimator; and an interference-suppression-capability-information transmitter adapted for imparting interference-suppression-capability information on the number of interfering radio wave beams of which interference can be suppressed by the interference rejection combining processor. Each of the radio base stations includes: multiple transmission antennas for transmitting radio waves on which signals destined for mobile terminals are carried; a channel characteristics receiver adapted for receiving, from a mobile terminal for which a desired radio base station is the radio base station, channel characteristic information that indicates the channel characteristics; an interference-suppression-capability-information receiver adapted for receiving interference-suppression-capability information from the mobile terminal for which a desired radio base station is the radio base station; an inter-base-station transmitter adapted for transmitting the channel characteristic information received at the channel characteristics receiver to other multiple radio base stations; an inter-base-station receiver adapted for receiving, from other multiple radio base stations, channel characteristic information for mobile terminals for which desired radio base stations are said other multiple radio base stations; and an inter-base-station collaborator adapted for giving weights to the radio waves to be transmitted from the multiple transmission antennas, on the basis of channel characteristic information that indicates channel characteristics for multiple mobile terminals received at the channel characteristics receiver and the inter-base-station receiver, so as to perform in-phase addition of an interfering radio wave beam directed to a mobile terminal for which the desired radio base station is another radio base station to an interfering radio wave beam transmitted from yet another radio base station for limiting the number of interfering radio wave beams that arrive at the mobile terminal. The inter-base-station collaborator is adapted for giving weights to the radio waves to be transmitted from the multiple transmission antennas, depending on the number of interfering radio wave beams of which interference can be suppressed by the mobile terminal for which the desired radio base station is said another radio base station.

With such a structure, the mobile terminal reports its interference-suppression-capability information to the desired radio base station. The inter-base-station collaborator of the radio base station gives weights to the radio waves transmitted from the multiple transmission antennas, depending on the number of interfering radio wave beams of which interference can be suppressed by the mobile terminal for which the desired radio base station is another radio base station. Accordingly, the inter-base-station collaborator is controlled in conformance with the number of interfering radio wave beams of which interference can be suppressed by the mobile terminal. As a result, it is possible to enhance efficiency of processing in the overall radio communication system in which radio base stations can collaborate to control interfering radio wave beams and mobile communication terminals have interference suppression capability.

The inter-base-station collaborator of each of the radio base stations may be adapted for not conducting the in-phase addition when the number of interfering radio wave beams of which interference can be suppressed by said mobile terminal for which the desired radio base station is said another radio base station is equal to or greater than the number of radio base stations that would be able to send interfering radio wave beams to said mobile terminal. The inter-base-station collaborator may be adapted for conducting the in-phase addition when the number of interfering radio wave beams of which interference can be suppressed by said mobile terminal for which the desired radio base station is said another radio base station is less than the number of radio base stations that would be able to send interfering radio wave beams to said mobile terminal.

With such a structure, the inter-base-station collaborator of the radio base station does not conduct the in-phase addition when the number of interfering radio wave beams of which interference can be suppressed by the mobile terminal is equal to or greater than the number of radio base stations that would be able to send interfering radio wave beams to the mobile terminal. Radio base stations need not necessarily collaborate to control interfering radio wave beams for mobile terminals that can inherently ensure good reception quality by virtue of its high interference suppression capability by IRC. By providing such an option of not conducting the in-phase addition depending on capability of the mobile terminal, it is possible to enhance efficiency of processing in the overall radio communication system.

According to a second aspect of the present invention, there is provided a radio communication system including multiple mobile terminals and multiple radio base stations communicating with the mobile terminals by radio. Each of the multiple mobile terminals includes: multiple reception antennas for receiving radio waves; an interference rejection combining processor adapted for giving weights to multiple signals obtained by the multiple reception antennas so as to suppress interference with a desired radio wave beam from a desired base station caused by interfering radio wave beams from interfering base stations; a signal separator adapted for separating a signal destined for the mobile terminal from signals destined for other mobile terminals among signals derived from radio waves received at the multiple receiving antennas with the use of the reception weights calculated at the interference rejection combining processor; channel estimator adapted for calculating downlink channel characteristics from the multiple radio base stations to the mobile terminal; a channel characteristics transmitter adapted for imparting channel characteristic information that indicates the channel characteristics calculated by the channel estimator; and an interference-suppression-capability-information transmitter adapted for imparting interference-suppression-capability information on the number of interfering radio wave beams of which interference can be suppressed by the interference rejection combining processor. Each of the radio base stations includes: multiple transmission antennas for transmitting radio waves on which signals destined for mobile terminals are carried; a channel characteristics receiver adapted for receiving, from a mobile terminal for which a desired radio base station is the radio base station, channel characteristic information that indicates the channel characteristics; an interference-suppression-capability-information receiver adapted for receiving interference-suppression-capability information from the mobile terminal for which a desired radio base station is the radio base station; an inter-base-station transmitter adapted for transmitting the channel characteristic information received at the channel characteristics receiver to other multiple radio base stations; an inter-base-station receiver adapted for receiving, from other multiple radio base stations, channel characteristic information for mobile terminals for which desired radio base stations are said other multiple radio base stations; an inter-base-station collaborator adapted for giving weights to the radio waves to be transmitted from the multiple transmission antennas, on the basis of channel characteristic information that indicates channel characteristics for multiple mobile terminals received at the channel characteristics receiver and at the inter-base-station receiver, so as to adjust a desired radio wave beam to a mobile terminal for which a desired radio base station is the radio base station and an interfering radio wave beam to another mobile terminal for which a desired radio base station is another radio base station; and a channel-characteristics-adjustment instructor adapted for, on the basis of the interference-suppression-capability information received at the interference-suppression-capability-information receiver, instructing each of the mobile terminals to adjust an amount of the channel characteristic information to be transmitted from the mobile terminal.

With such a structure, the mobile terminal reports the interference-suppression-capability information to the desired radio base station. On the basis of the interference-suppression-capability information the channel-characteristics-adjustment instructor of the radio base station instructs each of the mobile terminals to adjust the amount of the channel characteristic information to be transmitted from the mobile terminal. In response to the instruction, the mobile terminal adjusts (for example, reduces) the amount of channel characteristic information, so that it is possible to enhance efficiency of processing in the overall radio communication system in which radio base stations can collaborate to control interfering radio wave beams and mobile communication terminals have interference suppression capability.

The channel-characteristics-adjustment instructor may be adapted for instructing each of the mobile terminals to adjust an amount of the channel characteristic information to be transmitted from the mobile terminal, such that the greater the number of interfering radio wave beams of which interference can be suppressed by the mobile terminal, the smaller the amount of the channel characteristic information to be transmitted from the mobile terminal.

With such a structure, the greater the number of interfering radio wave beams of which interference can be suppressed by the mobile terminal, the more reduced the amount of the channel characteristic information to be transmitted from the mobile terminal. As a result, for a mobile terminal that can suppress interference in a large number of interfering radio wave beams, the amount of the channel characteristic information to be transmitted from the mobile terminal is more reduced, so that precision of adjustment of interfering radio wave beams at the inter-base-station collaborator of the radio base station is decreased, but the processing load for adjustment thereat is reduced. Radio base stations need not necessarily collaborate to control interfering radio wave beams, with high precision, for mobile terminals that can inherently ensure good reception quality by virtue of its high interference suppression capability by IRC. By providing such an option of reducing the amount of the channel characteristic information, it is possible to enhance efficiency of processing in the overall radio communication system. On the other hand, for a mobile terminal that can suppress interference in only a small number of interfering radio wave beams, the amount of the channel characteristic information to be transmitted from the mobile terminal may be increased. In this case, for the mobile terminal, precision of adjustment of interfering radio wave beams at the inter-base-station collaborator of the radio base station is improved.

According to the first aspect of the present invention, there is provided a radio base station communicating with mobile terminals by radio and communicating with other multiple radio base stations. The radio base station includes: multiple transmission antennas for transmitting radio waves on which signals destined for mobile terminals are carried; a channel characteristics receiver adapted for receiving, from a mobile terminal for which a desired radio base station is the radio base station, channel characteristic information that indicates downlink channel characteristics from the radio base station and other radio base stations; an interference-suppression-capability-information receiver adapted for receiving interference-suppression-capability information from the mobile terminal for which a desired radio base station is the radio base station, the interference-suppression-capability information being related to the number of interfering radio wave beams of which interference can be suppressed by the mobile terminal; an inter-base-station transmitter adapted for transmitting the channel characteristic information received at the channel characteristics receiver to other multiple radio base stations; an inter-basestation receiver adapted for receiving, from other multiple radio base stations, channel characteristic information for mobile terminals for which desired radio base stations are said other multiple radio base stations; and an inter-base-station collaborator adapted for giving weights to the radio waves to be transmitted from the multiple transmission antennas, on the basis of channel characteristic information that indicates channel characteristics for multiple mobile terminals received at the channel characteristics receiver and the inter-base-station receiver, so as to perform in-phase addition of an interfering radio wave beam directed to a mobile terminal for which the desired radio base station is another radio base station to an interfering radio wave beam transmitted from yet another radio base station for limiting the number of interfering radio wave beams that arrive at the mobile terminal. The inter-base-station collaborator is adapted for giving weights to the radio waves to be transmitted from the multiple transmission antennas, depending on the number of interfering radio wave beams of which interference can be suppressed by the mobile terminal for which the desired radio base station is said another radio base station.

The inter-base-station collaborator may be adapted for not conducting the in-phase addition when the number of interfering radio wave beams of which interference can be suppressed by said mobile terminal for which the desired radio base station is said another radio base station is equal to or greater than the number of radio base stations that would be able to send interfering radio wave beams to said mobile terminal, and the inter-base-station collaborator may be adapted for conducting the in-phase addition when the number of interfering radio wave beams of which interference can be suppressed by said mobile terminal for which the desired radio base station is said another radio base station is less than the number of radio base stations that would be able to send interfering radio wave beams to said mobile terminal.

According to the second aspect of the present invention, there is provided a radio base station communicating with mobile terminals by radio and communicating with other multiple radio base stations. The radio base station includes: multiple transmission antennas for transmitting radio waves on which signals destined for mobile terminals are carried; a channel characteristics receiver adapted for receiving, from a mobile terminal for which a desired radio base station is the radio base station, channel characteristic information that indicates downlink channel characteristics from the radio base station and other radio base stations; an interference-suppression-capability-information receiver adapted for receiving interference-suppression-capability information from the mobile terminal for which a desired radio base station is the radio base station, the interference-suppression-capability information being related to the number of interfering radio wave beams of which interference can be suppressed by the mobile terminal; an inter-base-station transmitter adapted for transmitting the channel characteristic information received at the channel characteristics receiver to other multiple radio base stations; an inter-base-station receiver adapted for receiving, from other multiple radio base stations, channel characteristic information for mobile terminals for which desired radio base stations are said other multiple radio base stations; and an inter-base-station collaborator adapted for giving weights to the radio waves to be transmitted from the multiple transmission antennas, on the basis of channel characteristic information that indicates channel characteristics for multiple mobile terminals received at the channel characteristics receiver and the inter-base-station receiver, so as to adjust a desired radio wave beam to a mobile terminal for which a desired radio base station is the radio base station and an interfering radio wave beam to another mobile terminal for which a desired radio base station is another radio base station; and a channel-characteristics-adjustment instructor adapted for, on the basis of the interference-suppression-capability information received at the interference-suppression-capability-information receiver, instructing each of the mobile terminals to adjust an amount of the channel characteristic information to be transmitted from the mobile terminal.

The channel-characteristics-adjustment instructor may be adapted for instructing each of the mobile terminals to adjust an amount of the channel characteristic information to be transmitted from the mobile terminal, such that the greater the number of interfering radio wave beams of which interference can be suppressed by the mobile terminal, the smaller the amount of the channel characteristic information to be transmitted from the mobile terminal.

The present invention provides a mobile terminal including: multiple reception antennas for receiving radio waves; an interference rejection combining processor adapted for giving weights to multiple signals obtained by the multiple reception antennas so as to suppress interference with a desired radio wave beam from a desired base station caused by interfering radio wave beams from interfering base stations; a signal separator adapted for separating a signal destined for the mobile terminal from signals destined for other mobile terminals among signals derived from radio waves received at the multiple receiving antennas with the use of the reception weights calculated at the interference rejection combining processor; channel estimator adapted for calculating downlink channel characteristics from multiple radio base stations to the mobile terminal; a channel characteristics transmitter adapted for imparting channel characteristic information that indicates the channel characteristics calculated by the channel estimator; and an interference-suppression-capability-information transmitter adapted for imparting interference-suppression-capability information on the number of interfering radio wave beams of which interference can be suppressed by the interference rejection combining processor.

The channel estimator or the channel characteristics transmitter may be adapted for adjusting an amount of the channel characteristic information to be transmitted from the mobile terminal in accordance with an instruction from the desired base station.

BRIEF DESCRIPTION OF THE DRAWINGS

FIG. 8 is a block diagram showing a structure of a radio base station according to the second embodiment of the present invention;

FIG. 9 is a block diagram showing a structure of a mobile terminal according to the third embodiment of the present invention.

DESCRIPTION OF EMBODIMENTS

With reference to the accompanying drawings, various embodiments according to the present invention will be described hereinafter.

Figure 1:
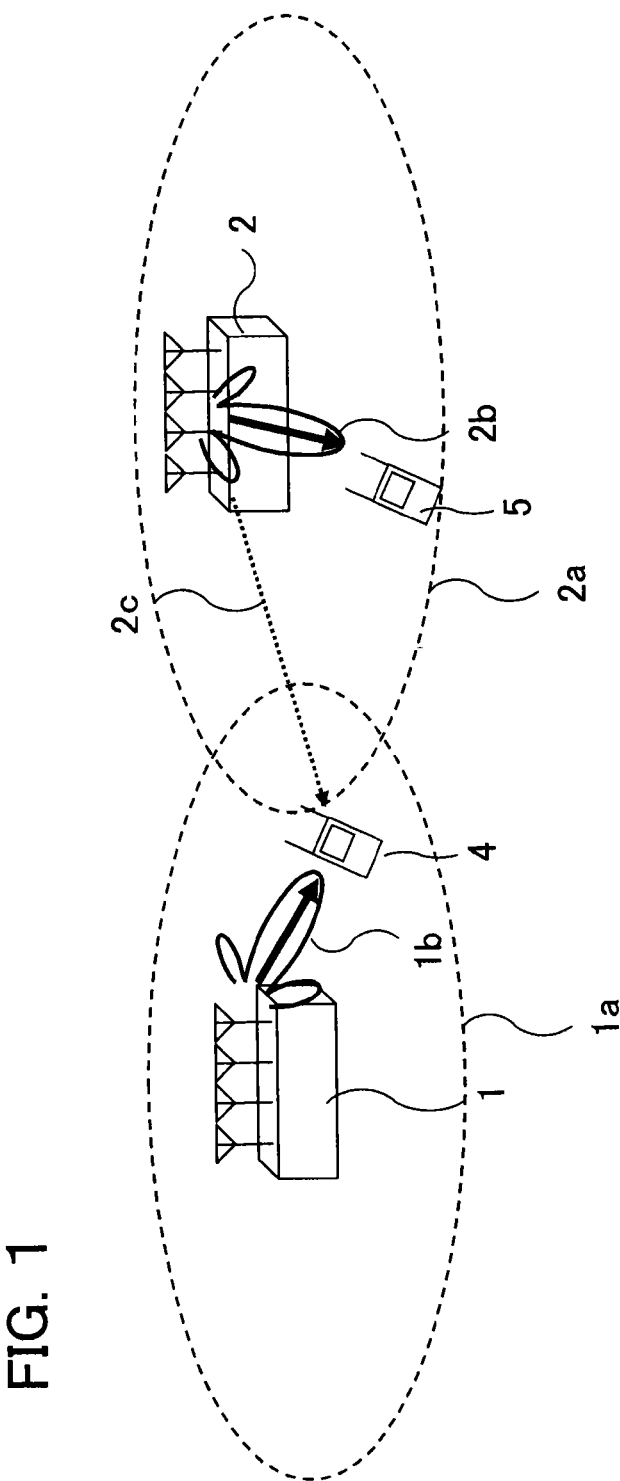
FIG. 1 is view showing a mobile communication terminal receiving an interfering beam from an interfering base station.
Figure 2:
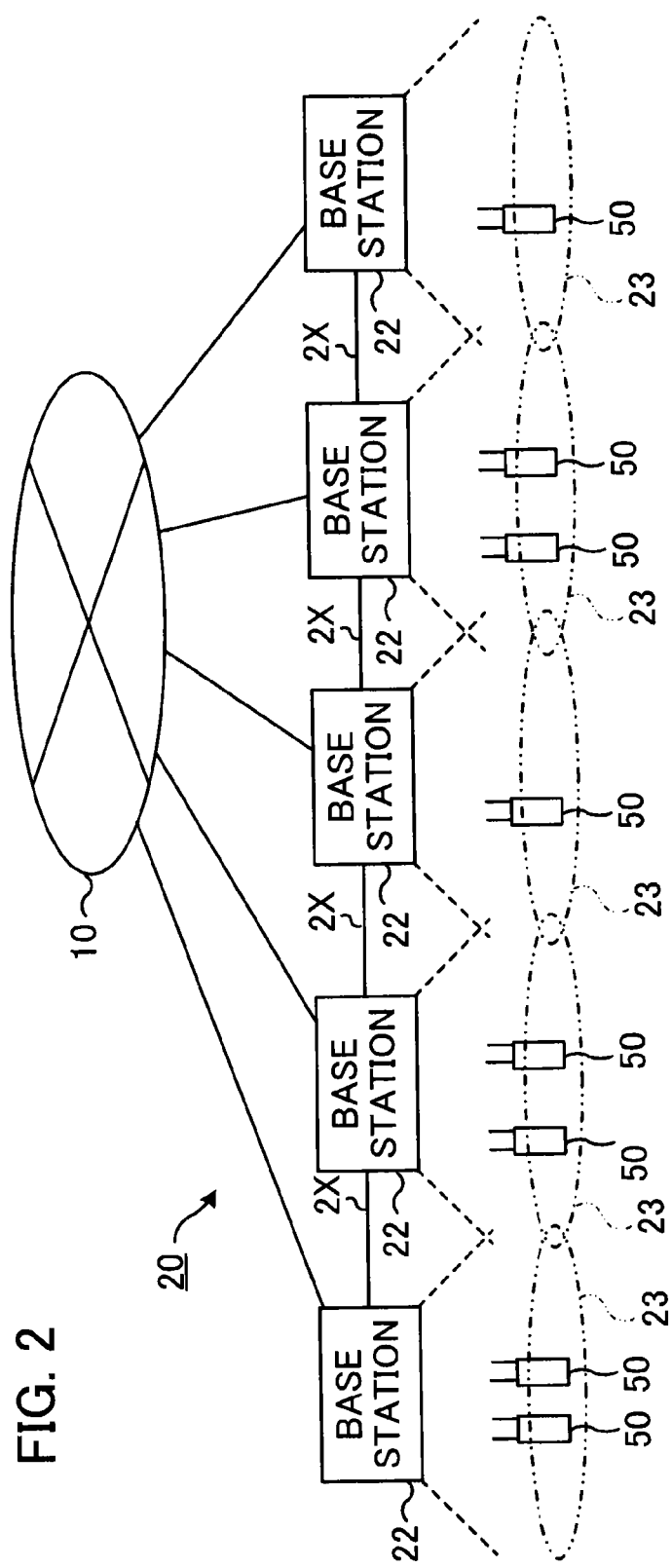
FIG. 2 is a block diagram showing a radio communication system according to embodiments of the present invention.

As shown in FIG. 2, a radio communication system according to embodiments of the present invention includes a core network 10 and a radio access network 20. The radio access network 20 includes multiple radio base stations 22 and X2 interfaces 2X connecting the radio base stations. The core network 10 is connected to multiple radio base stations 22. Each of the radio base stations 22 communicates with a mobile terminal 50 located in a cell 23 of the radio base station. The mobile terminal 50 is, for example, a mobile phone such as a user equipment (UE) used in Long Term Evolution (LTE) in the Universal Mobile Telecommunications System (UMTS).

Each of the radio base stations 22 may be an evolved Node B (eNB) in UMTS. Alternatively, each of the radio base stations 22 may be an access point in a radio local area network (LAN) or in Worldwide Interoperability for Microwave Access (WiMAX).

First Embodiment

Figure 3:
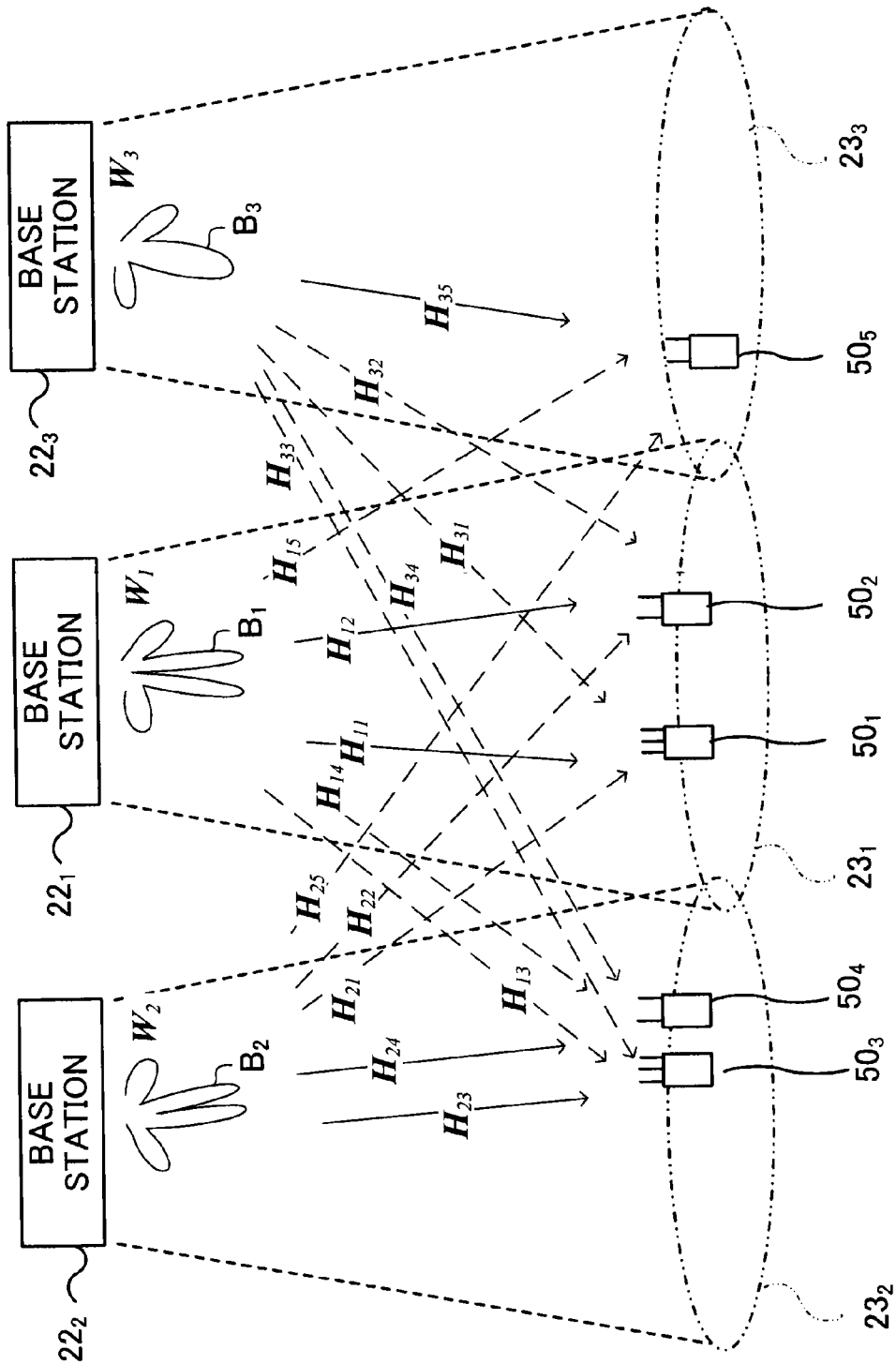
FIG. 3 is a schematic view showing downlink channel characteristics in the radio communication system.

The radio communication system according to the first embodiment is related to interference alignment (IA) described above. FIG. 3 shows outline of downlink channel characteristics in the radio communication system. For the purpose of facilitating understanding, FIG. 3 shows only three radio base stations 22 (a first radio base station $22_1$, a second radio base station $22_2$, and a third radio base station $22_3$) and five mobile terminals 50 (a first mobile terminal $50_1$, a second mobile terminal $50_2$, a third mobile terminal $50_3$, a fourth mobile terminal $50_4$, and a fifth mobile terminal $50_5$).

The first mobile terminal $50_1$ and the second mobile terminal $50_2$ are located in the cell $23_1$ of the first radio base station $22_1$, and are connected to the first radio base station $22_1$. The first radio base station $22_1$ actually downlinks data signals to the first mobile terminal $50_1$ and the second mobile terminal $50_2$. The third mobile terminal $50_3$ and the fourth mobile terminal $50_4$ are located in the cell $23_2$ of the second radio base station $22_2$, and are connected to the second radio base station $22_2$. The second radio base station $22_2$ actually downlinks data signals to the third mobile terminal $50_3$ and the fourth mobile terminal $50_4$. The fifth mobile terminal $50_5$ is located in the cell $23_3$ of the third radio base station $22_3$, and is connected to the third radio base station $22_3$. The third radio base station $22_1$ actually downlinks data signals to the fifth mobile terminal $50_5$.

Let us assume that for mobile terminals 50 connected to the first radio base station $22_1$, the second radio base station $22_2$ and the third radio base station $22_3$ are base stations that should collaborate with the first radio base station $22_1$. On the other hand, let us assume that for mobile terminals 50 connected to the second radio base station $22_2$, the first radio base station $22_1$ is a base station that should collaborate with the second radio base station $22_2$, but the third radio base station $22_3$ is not a base station that should collaborate with the second radio base station $22_2$. Let us assume that for mobile terminals 50 connected to the second radio base station $22_2$, the first radio base station $22_1$ is a base station that should collaborate with the third radio base station $22_3$, but the second radio base station $22_2$ is not a base station that should collaborate with the third radio base station $22_3$. Each radio base station 22 knows the other one or more radio base stations that should collaborate with the radio base station itself for mobile terminals 50 connected to the radio base station itself.

Each mobile terminal 50 shown in FIG. 3 can receive, from the radio base station 22 to which the mobile terminal 50 is connected, data signals and a reference signal. Each mobile terminal 50 can also receive from radio base stations 22 to which the mobile terminal 50 is not connected, only the reference signal. On the basis of reference signals sent from radio base stations 22, a channel estimator 60 of each mobile terminal 50 individually calculates downlink channel impulse matrixes $H_{ij}$. Suffix i denotes the ordinal number of the radio base station 22, whereas suffix j denotes the ordinal number of the mobile terminal 50.

For example, on the basis of the reference signal sent from the first radio base station $22_1$, the first mobile terminal $50_1$ calculates a channel impulse matrix $H_{11}$, whereas the third mobile terminal $50_3$ calculates a channel impulse matrix $H_{23}$ on the basis of the reference signal sent from the second radio base station $22_2$. Each channel impulse matrix contains elements of which the number depends on the number of transmission antennas of the radio base station 22 and the number of reception antennas of the mobile terminal 50.

Each mobile terminal 50 can also discriminate reference signals from radio base stations 22 to which the mobile terminal 50 is not connected, and also calculates downlink channel impulse matrixes from the radio base stations 22 that do not send data signals to the mobile terminal 50 on the basis of the reference signals. For example, the first mobile terminal $50_1$ calculates a channel impulse matrix $H_{21}$ with regard to the second radio base station $22_2$, and also calculates a channel impulse matrix $H_{31}$ with regard to the third radio base station $22_3$.

Each mobile terminal 50 sends a signal indicating multiple channel impulse matrixes calculated by the mobile terminal 50 itself to the radio base station 22 (desired radio base station) to which the mobile terminal 50 itself is connected. For example, the first mobile terminal $50_1$ reports the channel impulse matrixes $H_{11}$, $H_{21}$, and $H_{31}$ to the first radio base station $22_1$ (see FIG. 5).

Collaborating radio base stations 22 mutually impart channel impulse matrixes reported from mobile terminals 50 with the use of inter-base-station communication. That is to say, the radio base station 22 imparts the channel impulse matrixes received at the radio base station 22 to one or more other radio base stations 22, and receives notices of channel impulse matrixes for other mobile terminals 50 from one or more other radio base stations 22. Thus, channel impulse matrixes calculated at mobile terminals 50 are shared in collaborating radio base stations 22.

Each radio base station includes multiple transmission antennas, and can give weights to radio waves to be transmitted from the multiple transmission antennas (precoding). The weights can be represented in, for example, a precoding matrix. The precoding matrix is an aggregate of weighting factors (transmission weights). In FIG. 3, precoding matrixes $W_1$, $W_2$, and $W_3$ of the radio base stations $22_1$, $22_2$, and $22_3$ are shown. On the basis of channel impulse matrixes received at the radio base station 22 itself and received by means of inter-base-station communication, the radio base station 22 generates the precoding matrix.

By means of the weights, the radio base station can direct main beams to mobile terminals connected to the radio base station. Furthermore, by means of the weights, multiple radio base stations that transmit interfering radio wave beams arriving at a mobile terminal (multiple radio base stations to which the mobile terminal is not connected) can collaborate to perform in-phase addition of interfering radio wave beams. In other words, a radio base station can perform in-phase addition of an interfering radio wave beam directed to a mobile terminal for which the desired radio base station is another radio base station to an interfering radio wave beam transmitted from yet another radio base station. By such an in-phase addition, the number of interfering radio wave beams arriving at the mobile terminal is reduced, although the strength of the resulting interfering radio wave beam is increased. In FIG. 3, an approximate shape of beams $B_1$ emitted by the transmission antennas of the first radio base station $22_1$ is shown. Approximate shapes of beams $B_2$ and beam $B_3$ emitted by the second radio base station $22_2$ and the third radio base station $22_3$ are also shown.

Figure 4:
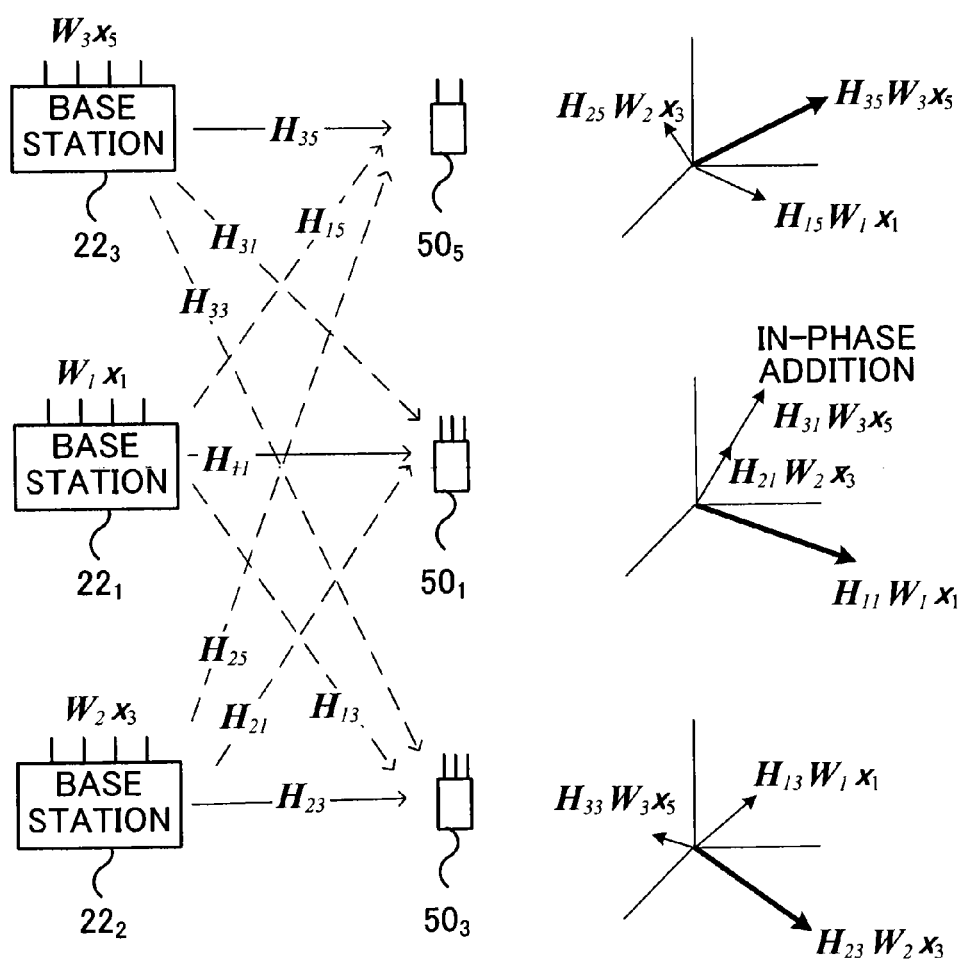
FIG. 4 is a schematic view showing interference alignment related to the first embodiment of the present invention.

FIG. 4 shows an example of interference alignment achieved by collaboration of base stations. For the purpose of facilitating understanding, FIG. 4 shows fewer mobile terminals 50 than those shown in FIG. 3. In a manner similar to the above, let us assume that for mobile terminals 50 connected to the first radio base station $22_1$, the second radio base station $22_2$ and the third radio base station $22_3$ are base stations that should collaborate with the first radio base station $22_1$. On the other hand, let us assume that for mobile terminals 50 connected to the second radio base station $22_2$, the first radio base station $22_1$ is a base station that should collaborate with the second radio base station $22_2$, but the third radio base station $22_3$ is not a base station that should collaborate with the second radio base station $22_2$. Let us assume that for mobile terminals 50 connected to the second radio base station $22_2$, the first radio base station $22_1$ is a base station that should collaborate with the third radio base station $22_3$, but the second radio base station $22_2$ is not a base station that should collaborate with the third radio base station $22_3$.

In FIG. 4, $x_j$ denotes a signal vector to be transmitted to a mobile terminal $50_j$. The signal vector is resulting from multiplying a channel impulse matrix (denoted as a matrix H (bold) in the figure) and a precoding matrix (denoted as a matrix W (bold) in the figure). Each mobile terminal 50 not only receives the desired radio wave beam, but also receives interfering radio wave beams. The right side of FIG. 4 shows the vector of the desired signal received at the mobile terminal shown at the left side of FIG. 4 and the vectors of interfering signals received at the mobile terminal shown at the left side of FIG. 4. For example, for the mobile terminal $50_5$, the vector of the desired signal is $H_{35}W_3x_5$, whereas the vectors of interfering signals are $H_{15}W_1x_1$ and $H_{25}W_2x_3$.

In a case in which the desired radio base station for a mobile terminal collaborates with multiple interfering radio base stations, the interfering radio base stations can execute interference alignment for the mobile terminal. In the example shown in FIG. 4, the radio base station $22_1$ that is the desired radiobase station for the mobile terminal $50_1$ collaborates with multiple radio base stations $22_2$ and $22_3$ (interfering radio base stations for mobile terminal $50_1$), so that the radio base stations $22_2$ and $22_3$ can execute interference alignment for the mobile terminal $50_1$. More specifically, when the radio base station $22_2$ generates the precoding matrix $W_2$, the radio base station $22_2$ considers not only the reception channel impulse matrix of the mobile terminal $50_3$ connected to the radio base station $22_2$, but also the reception channel impulse matrix $H_{21}$ of the mobile terminal $50_1$ received from the desired radio base station $22_1$ for the mobile terminal $50_1$. This reception channel impulse matrix is related to interference that the radio base station $22_2$ gives to the mobile terminal $50_1$.

On the other hand, when the radio base station $22_3$ generates the precoding matrix $W_3$, the radio base station $22_3$ considers not only the reception channel impulse matrix of the mobile terminal $50_5$ connected to the radio base station $22_3$, but also the reception channel impulse matrix $H_{31}$ of the mobile terminal $50_1$ received from the desired radio base station $22_1$ for the mobile terminal $50_1$. This reception channel impulse matrix is related to interference that the radio base station $22_3$ gives to the mobile terminal $50_1$.

Furthermore, the interfering radio base stations $22_2$ and $22_3$ adjusts the precoding matrixes $W_2$ and $W_3$ to conduct in-phase addition of interfering signal vectors $H_{21}W_2x_3$ and $H_{31}W_3x_5$ for the mobile terminal $50_1$. Consequently, the phases of the interfering signal vectors are aligned. For adjusting either or both of the precoding matrixes $W_2$ and $W_3$, the interfering radio base station $22_2$ or $22_3$ may impart the precoding matrix to the other, or the base stations $22_2$ and $22_3$ may impart the precoding matrixes to each other. Since the phases of the interfering signal vectors are aligned, the number of interfering radio wave beams arriving at the mobile terminal $50_1$ is reduced.

Figure 5:
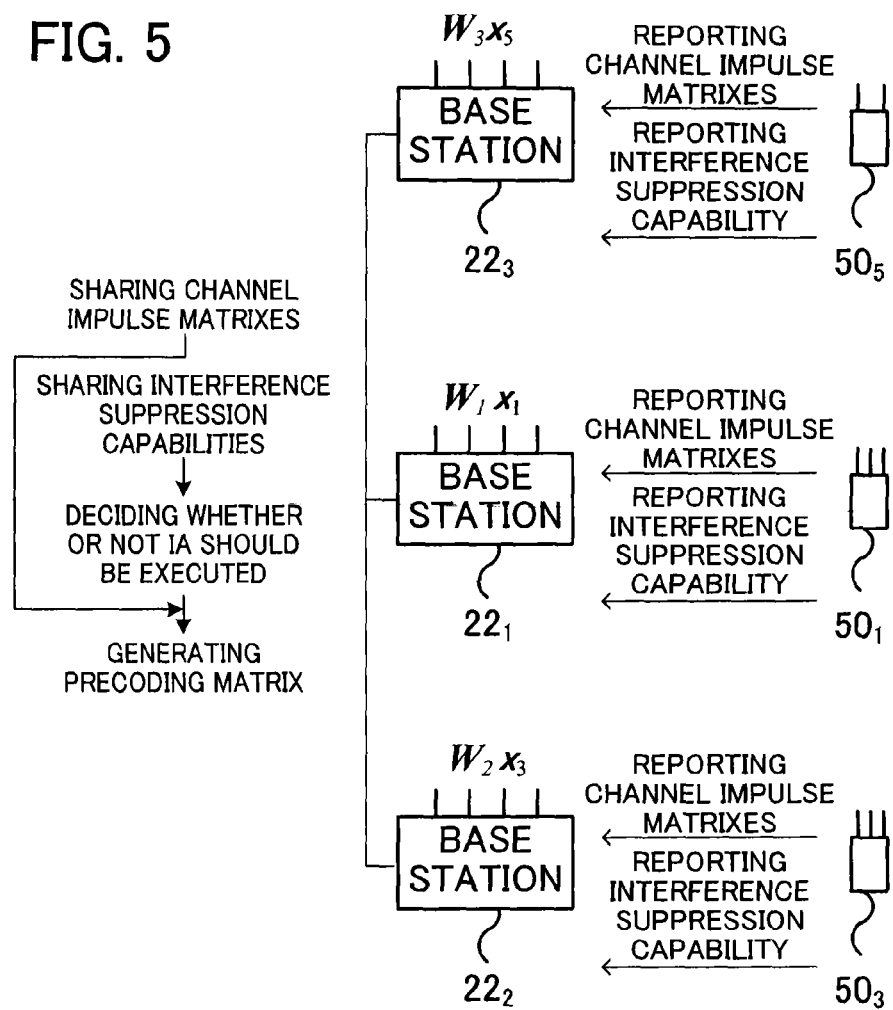
FIG. 5 is a view showing an outline of operations of a radio communication system according to the first embodiment.

In this embodiment, each mobile terminal 50 has a function for executing IRC. As shown in FIG. 5, each mobile terminal 50 transmits interference-suppression-capability information that indicates its interference suppression capability to its desired base station.

The interference-suppression-capability information reported by a mobile terminal 50 is related to the number of interfering radio wave beams of which interference can be suppressed by an interference rejection combining processor of the mobile terminal 50. For example, the mobile terminal 50 may report information that indicates the number itself of interfering radio wave beams of which interference can be suppressed by an interference rejection combining processor. The number A of interfering radio wave beams of which interference can be suppressed by an interference rejection combining processor (the number of degrees of spatial freedom of the interference rejection combining processor) is derived from the number B of reception antennas of the mobile terminal 50 and the number C of transmission streams of the desired signal as follows:

$$A=B-C$$

Since the number B of reception antennas is already known to the mobile terminal 50, the mobile terminal 50 can calculate the number A of degrees of spatial freedom on the basis of the number C of transmission streams of the desired signal. The mobile terminal 50 may report a signal that indicates the thus-calculated number A of degrees of spatial freedom to the desired base station.

Collaborating radio base stations 22 mutually impart interference-suppression-capability information reported from mobile terminals 50 with the use of inter-base-station communication. That is to say, the radio base station 22 imparts interference-suppression-capability information received at the radio base station 22 to one or more other radio base stations 22, and receives notices of interference-suppression-capability information of other mobile terminals 50 from one or more other radio base stations 22. Thus, interference-suppression-capability information of each mobile terminal 50 is shared in collaborating radio base stations 22.

Radio base stations need not necessarily collaborate to control interfering radio wave beams for mobile terminals that can inherently ensure good reception quality by virtue of its high interference suppression capability by IRC. Rather, if radio base stations collaborate to control interfering radio wave beams for such mobile terminals, it will be predicted that efficiency of processing in the overall radio communication system may be decreased.

Accordingly, in the radio communication system, interfering base stations (collaborating interfering base stations) for the mobile terminal 50 do not conduct the in-phase addition (do not conduct IA) when the number A of interfering radio wave beams of which interference can be suppressed by the mobile terminal 50 (the number of degrees of spatial freedom of the mobile terminal 50) is equal to or greater than the number of interfering radio base stations that would be able to send interfering radio wave beams to the mobile terminal 50. In contrast, only when the number A of degrees of spatial freedom of the mobile terminal 50 is less than the number of interfering radio base stations that would be able to send interfering radio wave beams to the mobile terminal 50, those interfering base stations execute the in-phase addition. In this manner, for interfering base stations (collaborating interfering base stations) for each mobile terminal 50 decides whether or not IA should be executed.

For example, for the mobile terminal $50_1$ connected to the radio base station $22_1$, two radio base stations $22_1$ and $22_2$ are interfering base stations. In this case, the number of interfering base stations that would be able to send interfering radio wave beams to the mobile terminal $50_1$ is two. In the case in which the number A of degrees of spatial freedom of the mobile terminal $50_1$ is two or more, the mobile terminal $50_1$ can sufficiently suppress interfering radio wave beams arriving from the radio base stations $22_1$ and $22_2$. Therefore, although these radio base stations $22_1$ and $22_2$ collaborate with the radio base station $22_1$, these radio base stations $22_1$ and $22_2$ do not conduct IA. On the other hand, in the case in which the number A of degrees of spatial freedom of the mobile terminal $50_1$ is less than two, the mobile terminal $50_1$ cannot sufficiently suppress interfering radio wave beams arriving from the radio base stations $22_1$ and $22_2$. Therefore, these radio base stations $22_1$ and $22_2$ collaborate to conduct IA.

After deciding whether or not IA should be executed as described above, each radio base station 22 generates a precoding matrix. Each mobile terminal 50 periodically reports channel impulse matrixes, and each radio base station 22 periodically generates the precoding matrix depending on reports of the channel impulse matrixes.

As described above, the radio base station 22 gives weights to the radio waves to be transmitted from the multiple transmission antennas of the radio base station 22, depending on the number of interfering radio wave beams of which interference can be suppressed by each mobile terminal 50 for which the desired radio base station is another radio base station. As a result, it is possible to enhance efficiency of processing in the overall radio communication system in which radio base stations 22 can collaborate to control interfering radio wave beams and mobile communication terminals have interference suppression capability.

In particular, by providing such an option of not conducting the in-phase addition depending on interference suppression capability of the mobile terminal 50, it is possible to enhance efficiency of processing in the overall radio communication system. For example, since the radio base station $22_3$ does not conduct IA for the mobile terminal $50_1$, the radio base station $22_3$ can form a more suitable desired radio wave beam for the mobile terminal $50_5$ connected to the radio base station $22_3$. The radio base station $22_2$ can also form a more suitable desired radio wave beam for the mobile terminal $50_3$ connected to the radio base station $22_2$ since the radio base station $22_2$ does not conduct IA for the mobile terminal $50_1$.

In the above description, interfering radio base stations $22_2$ and $22_3$ for the mobile terminal $50_1$ collaborate to conduct IA for the mobile terminal $50_1$, or does not conduct the IA depending on the interference suppression capability of the mobile terminal $50_1$. However, of course, interfering radio base stations for another mobile terminal collaborate to conduct IA for the mobile terminal, or do not conduct the IA depending on the interference suppression capability of the mobile terminal. For example, in FIG. 4, when interfering radio base stations $22_1$ and $22_2$ for the mobile terminal $50_5$ collaborate for the mobile terminal $50_5$, the radio base stations $22_1$ and $22_2$ can conduct IA to conduct in-phase addition of $H_{15}W_1x_1$ and $H_{25}W_2x_3$, and do not need to conduct the in-phase addition depending on the interference suppression capability of the mobile terminal $50_5$.

Figure 6:
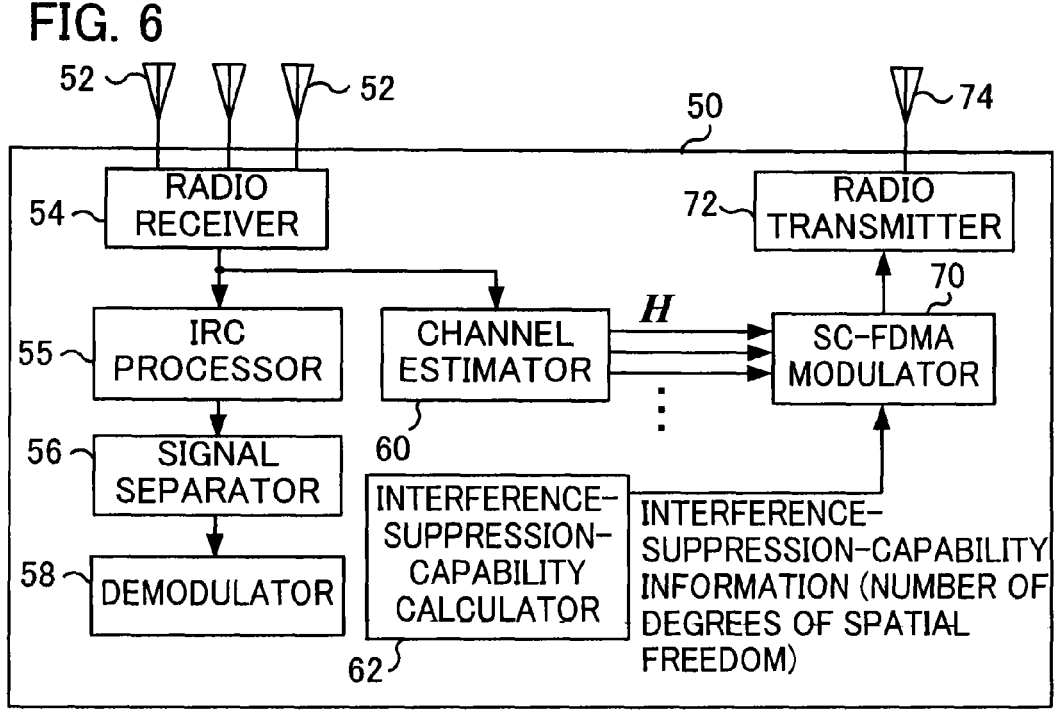
FIG. 6 is a block diagram showing a structure of a mobile terminal according to the first embodiment.

FIG. 6 shows the structure of each mobile terminal 50 according to the first embodiment. FIG. 6 shows only parts involved in reception and transmission of signals and does not show other parts. As shown in FIG. 6, each mobile terminal 50 includes multiple receiving antennas 52 for receiving radio waves, and a radio receiver 54 that is a reception circuit for converting radio waves received at the reception antennas 52 to electrical signals. The reception antennas 52 form an adaptive array antenna, of which the output signal derived from a radio wave arriving from a specific direction can be separated by using a signal separation technology. Downlink MIMO can be executed since each radio base station 22 includes multiple transmission antennas and each mobile terminal 50 includes at least two reception antennas 52.

Each mobile terminal 50 further includes an interference rejection combining processor 55, a signal separator 56, a demodulator 58, a channel estimator 60, an interference-suppression-capability calculator 62, an SC-FDMA (Single-Carrier Frequency-Division Multiple Access) modulator 70, a radio transmitter 72, and at least one transmission antenna 74. The interference rejection combining processor 55, the signal separator 56, the demodulator 58, the channel estimator 60, the interference-suppression-capability calculator 62 and the SC-FDMA modulator 70 are functional blocks accomplished by the fact that a CPU (central processing unit, not shown) of the mobile terminal executes a computer program and operates in accordance with the computer program. The radio transmitter 72 is a transmission circuit for converting electrical signals to radio waves to be sent from the transmission antenna 74.

The interference rejection combining processor 55 executes IRC. other words, regarding downlink communication, the interference rejection combining processor 55 gives weights to signals obtained by the reception antennas 52 so that the mobile terminal 50 suppresses interference with the desired radio wave beam from the visited base station (desired base station) caused by interfering radio wave beams from interfering base stations. As the IRC technique, for example, any known technology may be used.

The signal separator 56 separates a signal destined for the mobile terminal 50 from signals destined for other mobile terminals among signals derived from radio waves received at the multiple receiving antennas 52 (signals output from the radio receiver 22) with the use of the reception weights calculated at the interference rejection combining processor 55. The demodulator 58 demodulates and decodes the signal destined for the mobile communication terminal separated by the signal separator 56 to obtain a data signal. In the illustrated embodiment, the signal separator 56 and the demodulator 58 are provided separately, but a mechanism for MLD (Maximum Likelihood Detection) that executes signal separation together with demodulation may be provided in the mobile terminal 50 instead of the signal separator 56 and the demodulator 58.

The channel estimator 60 executes channel estimation for calculating downlink channel characteristics from multiple radio base stations to the mobile terminal 50. For example, the channel estimator 60 calculates a channel impulse matrix (denoted as a matrix H (bold) in the figure) representing downlink channel impulse characteristics from the reference signal among the electric signals from the radio receiver 54. The channel estimator 60 calculates not only a channel impulse matrix on the downlink from the desired radio base station 22 to which the mobile terminal 50 is connected, but also channel impulse matrixes on the downlinks from interfering radio base stations 22 to which the mobile terminal 50 is not connected as long as the mobile terminal 50 can receive the reference signal.

A signal (channel characteristic information) indicating the channel impulse matrixes calculated by the channel estimator 60 is supplied to the SC-FDMA modulator 70. Although not shown, a data signal generated on the basis of a user input and a data signal generated from user voice are also supplied to the SC-FDMA modulator 70. The SC-FDMA modulator 70 performs various processes required to send an uplink signal by SC-FDMA and supplies the processed signal to the radio transmitter 72. Thus, the data signals and the signal indicating the channel impulse matrixes are sent by radio to the radio base station 22 (desired radio base station). The channel estimator 60, the SC-FDMA modulator 70, and the radio transmitter 72 serve as a channel characteristics transmitter for imparting channel characteristic information indicating the channel characteristics calculated at the channel estimator 60.

The interference-suppression-capability calculator 62 calculates the interference suppression capability of the interference rejection combining processor 55. More specifically, on the basis of the number B of the reception antennas 52 of the mobile terminal 50 and the number C of transmission streams of the desired signal received from the desired base station, the interference-suppression-capability calculator 62 calculates the number A of interfering radio wave beams of which interference can be suppressed by the interference rejection combining processor 55 (the number of degrees of spatial freedom of the interference rejection combining processor 55). A signal (interference-suppression-capability information) indicating the number A of degrees of spatial freedom calculated by the interference-suppression-capability calculator 62 is supplied to the SC-FDMA modulator 70, and then is sent by radio to the radio base station 22 (desired radio base station) by means of the SC-FDMA modulator 70 and the radio transmitter 72. Thus, the interference-suppression-capability calculator 62, the SC-FDMA modulator 70, and the radio transmitter 72 serve as an interference-suppression-capability-information transmitter for imparting the interference-suppression-capability information related to the number of interfering radio wave beams of which interference can be suppressed by the interference rejection combining processor 55 to the desired base station.

Figure 7:
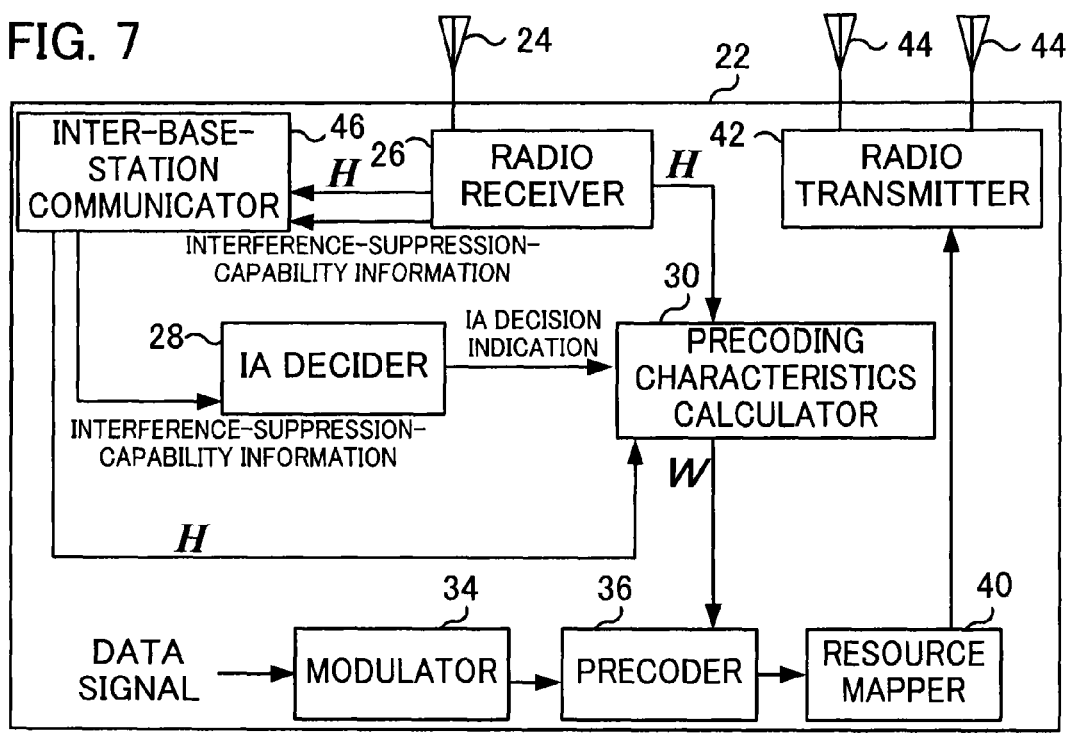
FIG. 7 is a block diagram showing a structure of a radio base station according to the first embodiment.

FIG. 7 shows the structure of the radio base station according to the first embodiment. FIG. 7 shows only parts involved in reception and transmission of signals and does not show other parts. As shown in FIG. 7, each radio base station 22 includes at least one reception antenna 24, a radio receiver 26, an IA decider 28, a precoding characteristics calculator 30, a modulator 34, a precoder 36, a resource mapper 40, a radio transmitter 42, at least two transmission antennas 44, and an inter-base-station communicator 46.

Among the above-mentioned elements in the radio base station 22, the IA decider 28 and the precoding characteristics calculator 30 are functional blocks accomplished by the fact that a CPU (not shown) of the radio base station 22 executes a computer program and operates in accordance with the computer program.

The radio base station 22 includes at least one reception antenna 24 for wireless reception by the radio base station 22 from the mobile terminal 50. The radio receiver 26 is a reception circuit for converting radio waves received at the reception antenna 24 to electrical signals.

The radio base station 22 includes at least two transmission antennas 44 for transmitting radio waves on which signals destined for mobile terminals are carried, so that the radio base station 22 can conduct wireless transmission to mobile terminals 50. Transmission antennas 44 form an adaptive array antenna, by which the directions of transmission beams can be controlled. The radio transmitter 42 is a transmission circuit for converting electrical signals to radio waves to be sent from the transmission antennas 44.

The inter-base-station communicator 46 is a communication interface by which the radio base station 22 having the inter-base-station communicator 46 communicates with other radio base stations 22.

The radio receiver 26 receives signals reported from mobile terminals 50 connecting to this radio base station 22, the signals indicating downlink channel impulse matrixes (denoted as matrixes H (bold) in the figure) for the mobile terminals 50. The term "connect" means being a status in which synchronization is established between the radio base station 22 and the mobile terminal 50, so that the radio base station 22 can actually send data signals to the mobile terminal 50, and the mobile terminal 50 can actually send data signals to the radio base station 22. That is to say, the radio receiver 26 receives the channel characteristic information indicating the downlink channel impulse matrixes from mobile terminals 50 for which the desired base station is the radio base station 22. In other words, the radio receiver 26 serves as a channel characteristics receiver.

The radio receiver 26 supplies the channel characteristic information to the precoding characteristics calculator 30 and to the inter-base-station communicator 46. The inter-base-station communicator 46 serves as an inter-base-station transmitter for sending the channel characteristic information received at the radio receiver 26 to other multiple radio base stations 22.

The inter-base-station communicator 46 also serves as an inter-base-station receiver for receiving, from other base stations, channel characteristic information of mobile terminals for which desired base stations are these other base stations. Thus, channel characteristic information of multiple mobile terminals is shared in multiple radio base stations 22. The inter-base-station communicator 46 supplies channel characteristic information of mobile terminals received from other radio base stations to the precoding characteristics calculator 30.

On the basis of the channel characteristic information indicating channel characteristics for multiple mobile terminals 50 received at the radio receiver 26 and the inter-base-station communicator 46, the precoding characteristics calculator 30 (inter-base-station collaborator) generates precoding characteristics for transmission beam forming, i.e., a precoding matrix. The precoding characteristics calculator 30 calculates the precoding matrix for each mobile terminal 50 (i.e., each of destination mobile terminals located in the cell of the radio base station 22, and each of mobile terminals located in cells of other radio base stations 22), in such a manner that the transmission antennas 44 direct main beams to destination mobile terminals 50 (connected to the radio base station 22) and conduct in-phase addition of interfering radio wave beams to be transmitted to mobile terminals 50 for which the desired radio base stations are other radio base stations 22 to interfering radio wave beams transmitted from yet other radio base stations for limiting the number of interfering radio wave beams that arrive at each of the mobile terminals 50. The precoding matrix (denoted as a matrix W (bold) in the figure) is an aggregate of weighting factors (transmission weights) generated for this purpose. Therefore, the precoding characteristics calculator 30 gives weights to radio waves to be sent from the multiple transmission antennas 44, such that the transmission antennas 44 direct main beams to destination mobile terminals 50 and in order to conduct IA. As a precoding technique, for example, any known technology may be utilized.

In order that interfering base stations align phases of the interfering signal vectors, each radio base station 22 may report the precoding matrix prepared by the radio base station 22 itself to other radio base stations 22 through the inter-base-station communicator 46, and the precoding characteristics calculator 30 may refer to precoding matrixes reported by other radio base stations 22 and received at the inter-base-station communicator 46.

Data signals are supplied to the modulator 34. Data signals are destined for mobile terminals 50 located in the cell 23 of the radio base station 22 and connected to the radio base station 22. Data signals indicate voice, video, still images, or text. Data signals may be generated by a data signal generator (not shown) in the radio base station 22, or may be signals sent to the radio base station 22 from other radio base stations 22 or the core network 10.

The modulator 34 encodes the data signal and further applies multi-level modulation. The multi-level modulation may be quadrature phase shift keying (QPSK), quadrature amplitude modulation (QAM), another phase shift keying (PSK), or another amplitude modulation (AM). The encoding may be turbo encoding, convolutional encoding, low density parity check (LDPC) encoding, or any other encoding.

The precoder 36 precodes the modulated data signal supplied from the modulator 34 according to the precoding matrix calculated by the precoding characteristics calculator 30, and supplies the precoded signal to the resource mapper 40.

The resource mapper 40 performs resource mapping for sending downlink signals with orthogonal frequency division multiple access (OFDMA). The signals to which resource mapping have been applied are supplied to the radio transmitter 42 and are sent by radio by the transmission antennas 44.

The radio receiver 26 receives interference-suppression-capability information of the mobile terminal 50 reported by the mobile terminal 50 connecting to the radio base station 22. In other words, the radio receiver 26 receives information on the number A of interfering radio wave beams of which interference can be suppressed by the interference rejection combining processor 55 of each mobile terminal 50 of which the desired base station is the radio base station 22. That is to say, the radio receiver 26 serves as an interference-suppression-capability-information receiver.

The radio receiver 26 supplies the interference-suppression-capability information to the inter-base-station communicator 46. The inter-base-station communicator 46 serves as an inter-base-station transmitter for transmitting the interference-suppression-capability information received at the radio receiver 26 to other multiple radio base stations 22.

The inter-base-station communicator 46 also serves as an inter-base-station receiver for receiving, from other multiple radio base stations, interference-suppression-capability information of mobile terminals for which desired base stations are these other radio base stations. Thus, interference-suppression-capability information of multiple mobile terminals is shared in multiple radio base stations 22. The inter-base-station communicator 46 supplies interference-suppression-capability information of mobile terminals received from other radio base stations to the IA (interference alignment) decider 28.

The IA decider 28 compares the number A of interfering radio wave beams of which interference can be suppressed by a mobile terminal 50 (the number of degrees of spatial freedom of the mobile terminal 50) indicated in the interference-suppression-capability information with the number of interfering radio base stations that would be able to send interfering radio wave beams to the mobile terminal 50. For this comparison, the radio base station 22 stores the number of neighboring base stations for mobile communication terminals for which the desired base stations are other radio base stations 22 (i.e., the number of interfering radio base stations that would be able to send interfering radio wave beams to mobile terminals 50).

When the number A of degrees of spatial freedom is equal to or greater than the number of interfering radio base stations that would be able to send interfering radio wave beams to the mobile terminal 50, the IA decider 28 decides that the in-phase addition should not be executed (in other words, IA should not be executed). In contrast, only when the number A of degrees of spatial freedom of the mobile terminal 50 is less than the number of interfering radio base stations that would be able to send interfering radio wave beams to the mobile terminal 50, the IA decider 28 decides that the in-phase addition should be executed. The IA decider 28 supplies an IA decision indication indicating this decision result to the precoding characteristics calculator 30.

When the IA decision indication indicates that IA should be conducted, the precoding characteristics calculator 30 generates the precoding matrix so that IA is executed. When the IA decision indication indicates that IA should not be conducted, the precoding characteristics calculator 30 generates the precoding matrix so that IA is not executed. Thus, depending on the number of interfering radio wave beams of which interference can be suppressed by the mobile terminal for which the desired radio base station is another radio base station, the precoding characteristics calculator 30 (inter-base-station collaborator) gives weights to the radio waves to be sent from the multiple transmission antennas. Therefore, when the number of interfering radio wave beams of which interference can be suppressed by the mobile terminal for which the desired radio base station is another radio base station is equal to or greater than the number of radio base stations that would be able to send interfering radio wave beams to the mobile terminal, the precoding characteristics calculator 30 does not perform in-phase addition for the mobile terminal. When the number of interfering radio wave beams of which interference can be suppressed by the mobile terminal for which the desired radio base station is another radio base station is less than the number of radio base stations that would be able to send interfering radio wave beams to the mobile terminal, the precoding characteristics calculator 30 conducts in-phase addition for the mobile terminal.

Second Embodiment

In the first embodiment, interference-suppression-capability information of each mobile terminal 50 is shared in collaborating radio base stations 22, and the IA decider 28 of a radio base station 22 that is an interfering base station for a mobile terminal 50 decides whether or not IA should be executed for the mobile terminal 50.

However, another radio base station 22 that is the desired base station for a mobile terminal 50 may decide whether or not IA should be executed for the mobile terminal 50. A second embodiment will be described next. FIG. 8 shows the structure of a radio base station 22 according to the second embodiment. In the second embodiment, the structure and operation of the mobile terminal 50 may be the same as those of the first embodiment shown in FIG. 6.

In FIG. 8, the same reference symbols are used to identify elements commonly used in FIG. 7, and these elements will not be described in detail. As shown in FIG. 8, the radio base station 22 according to the second embodiment includes an IA decider 128 instead of the IA decider 28. The IA decider 128 decides whether or not other radio base stations 22 should execute IA. The IA decider 128 is a functional block accomplished by the fact that a CPU (not shown) of the radio base station 22 executes a computer program and operates in accordance with the computer program.

The radio receiver 26 receives interference-suppression-capability information of the mobile terminal 50 reported by the mobile terminal 50 connecting to the radio base station 22. In other words, the radio receiver 26 receives information on the number A of interfering radio wave beams of which interference can be suppressed by the interference rejection combining processor 55 of each mobile terminal 50 of which the desired base station is the radio base station 22. That is to say, the radio receiver 26 serves as an interference-suppression-capability-information receiver.

The radio receiver 26 supplies the interference-suppression-capability information to the IA (interference alignment) decider 128. The IA decider 128 compares the number A of interfering radio wave beams of which interference can be suppressed by a mobile terminal 50 indicated in the interference-suppression-capability information with the number of interfering radio base stations that would be able to send interfering radio wave beams to the mobile terminal 50. For this comparison, the radio base station 22 stores the number of neighboring base stations for mobile communication terminals for which the desired base station is the radio base stations 22 itself (i.e., the number of interfering radio base stations that would be able to send interfering radio wave beams to mobile terminals 50).

When the number A of degrees of spatial freedom is equal to or greater than the number of interfering radio base stations that would be able to send interfering radio wave beams to the mobile terminal 50, the IA decider 128 decides that the in-phase addition should not be executed (in other words, IA should not be executed). In contrast, only when the number A of degrees of spatial freedom of the mobile terminal 50 is less than the number of interfering radio base stations that would be able to send interfering radio wave beams to the mobile terminal 50, the IA decider 128 decides that the in-phase addition should be executed. The IA decider 128 supplies an IA decision indication indicating this decision result to the inter-base-station communicator 46. The inter-base-station communicator 46 serves as an inter-base-station transmitter for transmitting the IA decision indications to other multiple radio base stations 22.

The inter-base-station communicator 46 also serves as an inter-base-station receiver for receiving, from other multiple radio base stations, IA decision indications for mobile terminals for which desired base stations are these other radio base stations. Thus, the radio base station 22 receives information indicating that IA should be executed for mobile terminals for which desired base stations are other radio base stations 22. The inter-base-station communicator 46 supplies the IA decision indications for the mobile terminals received from other radio base stations to the precoding characteristics calculator 30.

When the IA decision indication indicates that IA should be conducted, the precoding characteristics calculator 30 generates the precoding matrix such that IA is executed. When the IA decision indication indicates that IA should be conducted, the precoding characteristics calculator 30 generates the precoding matrix such that IA is not executed. Thus, depending on the number of interfering radio wave beams of which interference can be suppressed by the mobile terminal for which the desired radio base station is another radio base station, the precoding characteristics calculator 30 (inter-base-station collaborator) gives weights to the radio waves to be sent from the multiple transmission antennas. Therefore, when the number of interfering radio wave beams of which interference can be suppressed by the mobile terminal for which the desired radio base station is another radio base station is equal to or greater than the number of radio base stations that would be able to send interfering radio wave beams to the mobile terminal, the precoding characteristics calculator 30 does not perform in-phase addition for the mobile terminal. When the number of interfering radio wave beams of which interference can be suppressed by the mobile terminal for which the desired radio base station is another radio base station is less than the number of radio base stations that would be able to send interfering radio wave beams to the mobile terminal, the precoding characteristics calculator 30 conducts in-phase addition for the mobile terminal.

Third Embodiment

In the first and the second embodiments, the interference-suppression-capability calculator 62 of each mobile terminal 50 calculates the number A of interfering radio wave beams of which interference can be suppressed by the interference rejection combining processor 55 (the number of degrees of spatial freedom of the interference rejection combining processor 55). In addition, a signal (interference-suppression-capability information) indicating the number A of degrees of spatial freedom calculated by the interference-suppression-capability calculator 62 is supplied to the SC-FDMA modulator 70, and then is sent by radio to the radio base station 22 (desired radio base station) by means of the SC-FDMA modulator 70 and the radio transmitter 72.

However, each mobile terminal 50 may send, to its desired radio base station 22, interference-suppression-capability information indicating the number B of the reception antennas 52 of the mobile terminal 50, instead of interference-suppression-capability information indicating the number A of degrees of spatial freedom of the interference rejection combining processor 55. In this case, on the basis of the number B of the reception antennas 52, the desired radio base station 22 or one of interfering radio base stations 22 may calculate the number A of interfering radio wave beams of which interference can be suppressed by the interference rejection combining processor 55 of the mobile terminal 50. A third embodiment related to this modification will be described. FIG. 9 shows the structure of a mobile terminal 50 according to the third embodiment. In the third embodiment, the structure of the radio base station 22 may be the same as that of the first embodiment shown in FIG. 7.

In FIG. 9, the same reference symbols are used to identify elements commonly used in FIG. 6, and these elements will not be described in detail. As shown in FIG. 9, the mobile terminal 50 according to the third embodiment does not include the interference-suppression-capability calculator 62. A signal (interference-suppression-capability information) indicating the number B of the reception antennas 52 of the mobile terminal 50 is supplied to the SC-FDMA modulator, and then is sent by radio to the radio base station 22 (desired radio base station) by means of the SC-FDMA modulator 70 and the radio transmitter 72. Thus, the interference-suppression-capability calculator 62, the SC-FDMA modulator 70, and the radio transmitter 72 serve as an interference-suppression-capability-information transmitter for imparting interference-suppression-capability information on the number of interfering radio wave beams of which interference can be suppressed by the interference rejection combining processor 55.

The radio receiver 26 (see FIG. 7) of the radio base station 22 receives interference-suppression-capability information of mobile terminals 50 connecting to this radio base station 22, reported from the mobile terminals 50. In other words, the radio receiver 26 receives information indicating the number B of the reception antennas 52 of each mobile terminal 50 for which the desired base station is this radio base station 22. That is to say, the radio receiver 26 serves as an interference-suppression-capability-information receiver. The radio receiver 26 supplies the interference-suppression-capability information to the inter-base-station communicator 46. The inter-base-station communicator 46 serves as an inter-base-station transmitter for transmitting the interference-suppression-capability information received at the radio receiver 26 to other multiple radio base stations 22.

The inter-base-station communicator 46 also serves as an inter-base-station receiver for receiving, from other multiple radio base stations, interference-suppression-capability information of each mobile terminal (indicating the number B of the reception antennas 52 of each mobile terminal 50) for which desired base stations are these other radio base stations. Thus, interference-suppression-capability information of multiple mobile terminals is shared in multiple radio base stations 22. The inter-base-station communicator 46 supplies interference-suppression-capability information of mobile terminals received from other radio base stations to the IA (interference alignment) decider 28.

On the basis of the number B of the reception antennas 52 of a mobile terminal 50 indicated by the interference-suppression-capability information, the IA decider 28 calculates the number A of interfering radio wave beams of which interference can be suppressed by the mobile terminal 50 (the number of degrees of spatial freedom of the mobile terminal 50). As described above, the number A of degrees of spatial freedom is derived from the number B of reception antennas of the mobile terminal 50 and the number C of transmission streams of the desired signal as follows:

$$A = B - C$$

For this calculation, in advance, the radio base station 22 has been informed of the number of transmission streams of a desired signal to be transmitted from a desired base station to the mobile terminal 50 by the desired base station. The IA decider 28 compares the number A of degrees of spatial freedom of a mobile terminal 50 with the number of interfering radio base stations that would be able to send interfering radio wave beams to the mobile terminal 50. For this comparison, the radio base station 22 stores the number of neighboring base stations for mobile communication terminals for which the desired base stations are other radio base stations 22 (i.e., the number of interfering radio base stations that would be able to send interfering radio wave beams to mobile terminals 50).

When the number A of degrees of spatial freedom is equal to or greater than the number of interfering radio base stations that would be able to send interfering radio wave beams to the mobile terminal 50, the IA decider 28 decides that the in-phase addition should not be executed (in other words, IA should not be executed). In contrast, only when the number A of degrees of spatial freedom of the mobile terminal 50 is less than the number of interfering radio base stations that would be able to send interfering radio wave beams to the mobile terminal 50, the IA decider 28 decides that the in-phase addition should be executed. The IA decider 28 supplies an IA decision indication indicating this decision result to the precoding characteristics calculator 30.

When the IA decision indication indicates that IA should be conducted, the precoding characteristics calculator 30 generates the precoding matrix so that IA is executed. When the IA decision indication indicates that IA should not be conducted, the precoding characteristics calculator 30 generates the precoding matrix so that IA is not executed. Thus, depending on the number of interfering radio wave beams of which interference can be suppressed by the mobile terminal for which the desired radio base station is another radio base station, the precoding characteristics calculator 30 (inter-base-station collaborator) gives weights to the radio waves to be sent from the multiple transmission antennas. Consequently, when the number of interfering radio wave beams of which interference can be suppressed by the mobile terminal for which the desired radio base station is another radio base station is equal to or greater than the number of radio base stations that would be able to send interfering radio wave beams to the mobile terminal, the precoding characteristics calculator 30 does not perform in-phase addition for the mobile terminal. When the number of interfering radio wave beams of which interference can be suppressed by the mobile terminal for which the desired radio base station is another radio base station is less than the number of radio base stations that would be able to send interfering radio wave beams to the mobile terminal, the precoding characteristics calculator 30 conducts in-phase addition for the mobile terminal.

Fourth Embodiment

In the third embodiment, the radio base station 22 has the structure shown in FIG. 7, whereas the mobile terminal 50 has the structure shown in FIG. 9. However, the radio base station 22 may have a structure shown in FIG. 8. A fourth embodiment related to this modification will be described. In the fourth embodiment, the structure and operation of the mobile terminal 50 may be the same as those of the third embodiment shown in FIG. 9.

The radio receiver 26 (see FIG. 8) of the radio base station 22 receives interference-suppression-capability information of mobile terminals 50 connecting to this radio base station 22, reported from the mobile terminals 50. In other words, the radio receiver 26 receives information indicating the number B of the reception antennas 52 of each mobile terminal 50 for which the desired base station is this radio base station 22. That is to say, the radio receiver 26 serves as an interference-suppression-capability-information receiver. The radio receiver 26 supplies the interference-suppression-capability information to the IA decider 128.

On the basis of the number B of the reception antennas 52 of a mobile terminal 50 indicated by the interference-suppression-capability information, the IA decider 128 calculates the number A of interfering radio wave beams of which interference can be suppressed by the mobile terminal 50 (the number of degrees of spatial freedom of the mobile terminal 50). As described above, the number A of degrees of spatial freedom is derived from the number B of reception antennas of the mobile terminal 50 and the number C of transmission streams of the desired signal as follows:

$$A=B-C$$

For this calculation, radio base station 22 uses the number of transmission streams of a desired signal to be transmitted from this radio base station 22 as the desired base station to the mobile terminal 50. The IA decider 128 compares the number A of degrees of spatial freedom of a mobile terminal 50 with the number of interfering radio base stations that would be able to send interfering radio wave beams to the mobile terminal 50. For this comparison, the radio base station 22 stores the number of neighboring base stations for mobile communication terminals for which the desired base station is the radio base station 22 itself (i.e., the number of interfering radio base stations that would be able to send interfering radio wave beams to mobile terminals 50).

When the number A of degrees of spatial freedom is equal to or greater than the number of interfering radio base stations that would be able to send interfering radio wave beams to the mobile terminal 50, the IA decider 128 decides that the in-phase addition should not be executed (in other words, IA should not be executed). In contrast, only when the number A of degrees of spatial freedom of the mobile terminal 50 is less than the number of interfering radio base stations that would be able to send interfering radio wave beams to the mobile terminal 50, the IA decider 128 decides that the in-phase addition should be executed. The IA decider 28 supplies an IA decision indication indicating this decision result to the inter-base-station communicator 46. The inter-base-station communicator 46 serves as an inter-base-station transmitter for transmitting the IA decision indications to other multiple radio base stations 22.

The inter-base-station communicator 46 also serves as an inter-base-station receiver for receiving, from other multiple radio base stations, IA decision indications for mobile terminals for which desired base stations are these other radio base stations. Thus, the radio base station 22 receives information indicating that IA should be executed for mobile terminals for which desired base stations are other radio base stations 22. The inter-base-station communicator 46 supplies the IA decision indications for the mobile terminals received from other radio base stations to the precoding characteristics calculator 30.

When the IA decision indication indicates that IA should be conducted, the precoding characteristics calculator 30 generates the precoding matrix so that IA is executed. When the IA decision indication indicates that IA should not be conducted, the precoding characteristics calculator 30 generates the precoding matrix so that IA is not executed. Thus, depending on the number of interfering radio wave beams of which interference can be suppressed by the mobile terminal for which the desired radio base station is another radio base station, the precoding characteristics calculator 30 (inter-base-station collaborator) gives weights to the radio waves to be sent from the multiple transmission antennas. Consequently, when the number of interfering radio wave beams, of which interference can be suppressed by the mobile terminal for which the desired radio base station is another radio base station, is equal to or greater than the number of radio base stations that would be able to send interfering radio wave beams to the mobile terminal, the precoding characteristics calculator 30 does not perform in-phase addition for the mobile terminal. When the number of interfering radio wave beams of which interference can be suppressed by the mobile terminal for which the desired radio base station is another radio base station is less than the number of radio base stations that would be able to send interfering radio wave beams to the mobile terminal, the precoding characteristics calculator 30 conducts in-phase addition for the mobile terminal.

Fifth Embodiment

Next, a fifth embodiment of the present invention will be described. Whereas the first to fourth embodiments are related to IA, the fifth embodiment relates to the above-mentioned CS/CB. In the fifth embodiment, the overall structure of the radio communication system is the same as that shown in FIG. 2.

In CS/CB, in a manner similar to IA described above in conjunction with FIG. 3, each mobile terminal 50 calculates the channel impulse matrix on the downlink from its desired radio base station 22 to the mobile terminal 50 and channel impulse matrixes on downlinks from interfering radio base stations 22 to the mobile terminal 50, and reports the channel impulse matrixes to the desired radio base station 22. Collaborating radio base stations 22 mutually impart channel impulse matrixes reported from mobile terminals 50 with the use of inter-base-station communication. Thus, channel impulse matrixes calculated at mobile terminals 50 are shared in collaborating radio base stations 22.

Each radio base station 22 includes multiple transmission antennas, and can give weights to radio waves to be sent from the multiple transmission antennas (precoding). The weights can be represented in, for example, a precoding matrix. The precoding matrix is an aggregate of weighting factors (transmission weights). In CS/CB, with the use of such weights, the transmission antennas 44 of the radio base station 22 can direct not only main beams to mobile terminals connected to the radio base station, but also can direct nulling beams other mobile terminals in cells of other radio base stations 22.

As in the above-described radio communication system executing IA, in a radio communication system executing CS/CB, radio base stations need not necessarily collaborate to control interfering radio wave beams for mobile terminals that can inherently ensure good reception quality by virtue of its high interference suppression capability by IRC. Rather, if radio base stations collaborate to control interfering radio wave beams for such mobile terminals, it is predicted that efficiency of processing in the overall radio communication system may be decreased.

Accordingly, in this radio communication system executing CS/CB, the desired base station for each mobile terminal 50 instructs the mobile terminal 50 to adjust an amount of the channel characteristic information to be transmitted from the mobile terminal 50, such that the greater the number A of interfering radio wave beams of which interference can be suppressed by the mobile terminal 50 (the number of degrees of spatial freedom of the mobile terminal 50), the smaller the amount of the channel characteristic information to be transmitted from the mobile terminal 50. As a result, for a mobile terminal 50 that can suppress interference in a large number of interfering radio wave beams, the amount of the channel characteristic information to be transmitted from the mobile terminal is more reduced, so that precision of adjustment of interfering radio wave beams at the group of radio base stations 22 is decreased, but the processing load for adjustment thereat is reduced. By providing such an option of reducing the amount of the channel characteristic information, it is possible to enhance efficiency of processing in the overall radio communication system.

In this embodiment, the structure and operation of the mobile terminal 50 may be the same as those of the first embodiment shown in FIG. 6. Therefore, the interference-suppression-capability calculator 62 of the mobile terminal 50 calculates the number A of interfering radio wave beams of which interference can be suppressed by the interference rejection combining processor 55 (the number of degrees of spatial freedom of the interference rejection combining processor 55) from the number B of the reception antennas 52 of the mobile terminal 50 and the number C of transmission streams of the desired signal received from the desired base station. A signal (interference-suppression-capability information) indicating the number A of degrees of spatial freedom calculated by the interference-suppression-capability calculator 62 is supplied to the SC-FDMA modulator 70, and then is sent by radio to the radio base station 22 (desired radio base station) by means of the SC-FDMA modulator 70 and the radio transmitter 72. Thus, the interference-suppression-capability calculator 62, the SC-FDMA modulator 70, and the radio transmitter 72 serve as an interference-suppression-capability-information transmitter for imparting interference-suppression-capability information on the number of interfering radio wave beams of which interference can be suppressed by the interference rejection combining processor 55.

Figure 10:
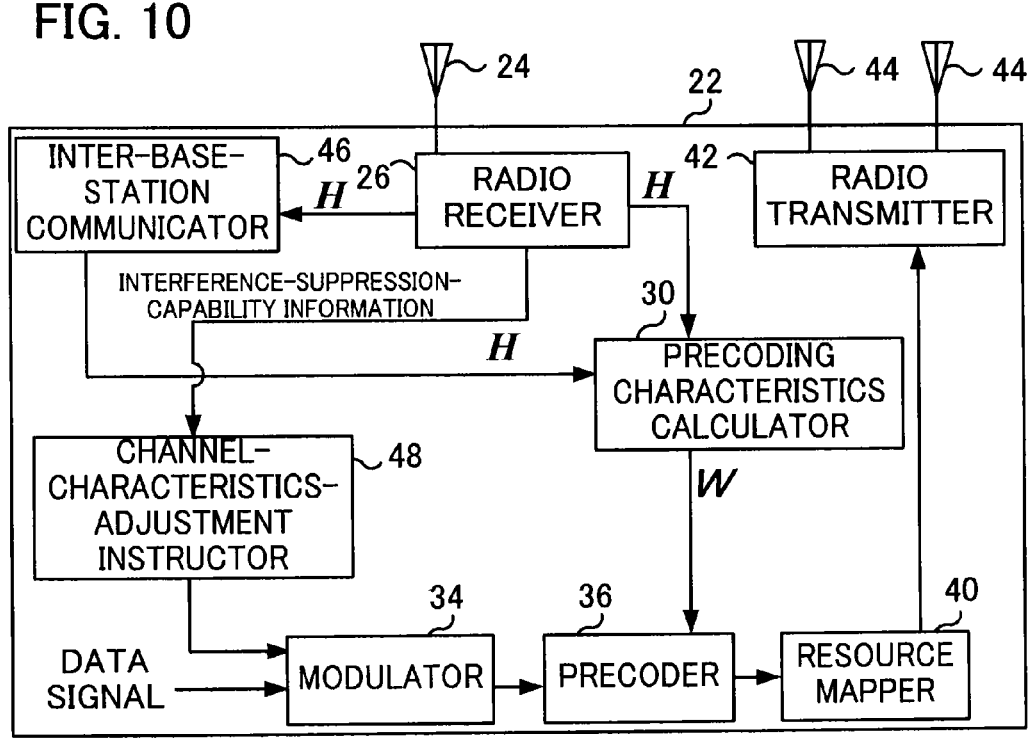
FIG. 10 is a block diagram showing a structure of a radio base station according to the fifth embodiment of the present invention.

FIG. 10 shows the structure of the radio base station according to the fifth embodiment. FIG. 10 shows only parts involved in reception and transmission of signals and does not show other parts. In FIG. 10, the same reference symbols are used to identify elements commonly used in FIG. 7, and these elements will not be described in detail.

However, in the radio base station 22 according to the fifth embodiment, the precoding characteristics calculator 30 has a CS/CB function instead of an IA function and generates a precoding matrix for CS/CB. In other words, the precoding characteristics calculator (inter-base-station collaborator) 30 gives weights to the radio waves to be transmitted from the multiple transmission antennas 44, on the basis of channel characteristic information that indicates channel characteristics for multiple mobile terminals received at the radio receiver (channel characteristics receiver) 26 and at the inter-base-station communicator (inter-base-station receiver) 46, so as to adjust desired radio wave beams to mobile terminals 50 for which the desired radio base station is the radio base station 22 and interfering radio wave beams to other mobile terminals 50 for which the desired radio base stations are other radio base stations.

As shown in FIG. 10, the radio base station 22 includes a channel-characteristics-adjustment instructor 48 instead of the IA decider 28. The channel-characteristics-adjustment instructor 48 is a functional block accomplished by the fact that a CPU (not shown) of the radio base station 22 executes a computer program and operates in accordance with the computer program.

The radio receiver 26 receives interference-suppression-capability information of the mobile terminal 50 reported by the mobile terminal 50 connecting to the radio base station 22. In other words, the radio receiver 26 receives information on the number A of interfering radio wave beams of which interference can be suppressed by the interference rejection combining processor 55 of each mobile terminal 50 for which the desired base station is the radio base station 22. That is to say, the radio receiver 26 serves as an interference-suppression-capability-information receiver.

The radio receiver 26 supplies the interference-suppression-capability information to the channel-characteristics-adjustment instructor 48. The channel-characteristics-adjustment instructor 48 instructs the mobile terminal 50 to adjust the amount of the channel characteristic information to be transmitted from the mobile terminal 50, such that the greater the number A of interfering radio wave beams of which interference can be suppressed by the mobile terminal 50 (that is, the number of degrees of spatial freedom) indicated by the interference-suppression-capability information, the smaller the amount of the channel characteristic information to be transmitted from the mobile terminal 50. More specifically, the channel-characteristics-adjustment instructor 48 compares the number A of degrees of spatial freedom with a threshold. When the number A is less than the threshold (when the mobile terminal 50 has a low interference suppression capability), the channel-characteristics-adjustment instructor 48 gives no special instruction to the mobile terminal 50. When the number A is equal to or greater than the threshold, the channel-characteristics-adjustment instructor 48 gives an instruction to the mobile terminal 50 to reduce the amount of channel characteristic information. This instruction is supplied to the modulator 34 and is sent to the destination mobile terminal 50 by radio.

"Reduce the amount of the channel characteristic information" may be any one of reducing the number of channel impulse matrixes to be sent from the mobile terminal 50 (for example, omission of transmission of channel impulse matrixes on signals from interfering base station), reducing the number of parameters contained in each channel impulse matrix, and prolonging the transmission interval of channel impulse matrixes from the mobile terminal 50.

Upon receiving the instruction to reduce the amount of channel characteristic information, the channel estimator 60 (see FIG. 6) of the mobile terminal 50 reduces the number of channel impulse matrixes or the number of parameters contained in each channel impulse matrix, or prolongs the transmission interval of channel impulse matrixes, in accordance with the instruction. Thus, according to the instruction from the desired base station, the channel estimator 60 of the mobile terminal 50 adjusts the amount of the channel characteristic information to be sent from the mobile terminal 50. As a result, at collaborating radio base stations 22, precision of adjustment of interfering radio wave beams is decreased, but the processing load for adjustment is reduced.

The channel-characteristics-adjustment instructor 48 may compare the number A of degrees of spatial freedom with at least two thresholds. For example, when the number A is less than the lower threshold (when the mobile terminal 50 has a low interference suppression capability), the channel-characteristics-adjustment instructor 48 may give no special instruction to the mobile terminal 50. When the number A is greater than the lower threshold, but less than the higher threshold, the channel-characteristics-adjustment instructor 48 may give an instruction to the mobile terminal 50 to reduce the amount of the channel characteristic information. When the number A is equal to or greater than the higher threshold, the channel-characteristics-adjustment instructor 48 may give an instruction to the mobile terminal 50 for further reducing the amount of the channel characteristic information.

Alternatively, when the number A is less than the lower threshold (when the mobile terminal 50 has a low interference suppression capability), the channel-characteristics-adjustment instructor 48 may give an instruction to the mobile terminal 50 to increase the amount of the channel characteristic information. When the number A is greater than the higher threshold, the channel-characteristics-adjustment instructor 48 may give an instruction to the mobile terminal 50 to reduce the amount of the channel characteristic information. As a result, for a mobile terminal 50 that can suppress interference in only a small number of interfering radio wave beams, the amount of the channel characteristic information to be transmitted from the mobile terminal 50 is increased, so that precision of adjustment of interfering radio wave beams at the precoding characteristics calculator 30 of the radio base station 22 is improved. For a mobile terminal 50 that can suppress interference in a large number of interfering radio wave beams, the amount of the channel characteristic information to be transmitted from the mobile terminal 50 is more reduced, so that precision of adjustment of interfering radio wave beams at the precoding characteristics calculator 30 of the radio base station 22 is decreased, but the processing load for adjustment thereat is reduced. "Increase the amount of the channel characteristic information" may be either one of increasing the number of parameters contained in each channel impulse matrix or shortening the transmission interval of channel impulse matrixes from the mobile terminal 50.

Sixth Embodiment

In the fifth embodiment, the interference-suppression-capability calculator 62 of each mobile terminal 50 calculates the number A of interfering radio wave beams of which interference can be suppressed by the interference rejection combining processor 55 (the number of degrees of spatial freedom of the interference rejection combining processor 55). A signal (interference-suppression-capability information) indicating the number A of degrees of spatial freedom calculated by the interference-suppression-capability calculator 62 is sent by radio from the mobile terminal 50 to the radio base station 22 (desired radio base station).

However, each mobile terminal 50 may send, to its desired radio base station 22, interference-suppression-capability information indicating the number B of the reception antennas 52 of the mobile terminal 50, instead of interference-suppression-capability information indicating the number A of degrees of spatial freedom of the interference rejection combining processor 55. In this case, on the basis of the number B of the reception antennas 52, the desired radio base station 22 may calculate the number A of interfering radio wave beams of which interference can be suppressed by the interference rejection combining processor 55 of the mobile terminal 50. A sixth embodiment related to this modification will be described. In the sixth embodiment, the structure of the radio base station 22 may be the same as that of the fifth embodiment shown in FIG. 10, and the structure and operation of the mobile terminal 50 may be the same as those of the fourth embodiment shown in FIG. 9.

As shown in FIG. 9, the mobile terminal 50 does not include the interference-suppression-capability calculator 62. A signal (interference-suppression-capability information) indicating the number B of the reception antennas 52 of the mobile terminal 50 is supplied to the SC-FDMA modulator, and then is sent by radio to the radio base station 22 (desired radio base station) from the mobile terminal 50.

The radio receiver 26 receives interference-suppression-capability information of mobile terminals 50 connecting to this radio base station 22, reported from the mobile terminals 50. In other words, the radio receiver 26 receives information indicating the number B of the reception antennas 52 of each mobile terminal 50 for which the desired base station is this radio base station 22. That is to say, the radio receiver 26 serves as an interference-suppression-capability-information receiver. The radio receiver 26 supplies the interference-suppression-capability information to the channel-characteristics-adjustment instructor 48.

On the basis of the number B of the reception antennas 52 of a mobile terminal 50 indicated by the interference-suppression-capability information, the channel-characteristics-adjustment instructor 48 calculates the number A of interfering radio wave beams of which interference can be suppressed by the mobile terminal 50 (the number of degrees of spatial freedom of the mobile terminal 50). As described above, the number A of degrees of spatial freedom is derived from the number B of reception antennas of the mobile terminal 50 and the number C of transmission streams of the desired signal as follows:

$$A = B - C$$

For this calculation, radio base station 22 uses the number of transmission streams of a desired signal to be transmitted from this radio base station 22 as the desired base station to the mobile terminal 50. Thereafter, in a manner similar to the fifth embodiment, the channel-characteristics-adjustment instructor 48 instructs the mobile terminal 50 to adjust the amount of the channel characteristic information to be transmitted from the mobile terminal 50, such that the greater the number A of interfering radio wave beams of which interference can be suppressed by the mobile terminal 50 (that is, the number of degrees of spatial freedom) indicated by the interference-suppression-capability information, the smaller the amount of the channel characteristic information to be transmitted from the mobile terminal 50. As a result, for a mobile terminal 50 that can suppress interference in a large number of interfering radio wave beams, the amount of the channel characteristic information to be transmitted from the mobile terminal 50 is more reduced, so that precision of adjustment of interfering radio wave beams at the precoding characteristics calculator 30 of the radio base station 22 is decreased, but the processing load for adjustment thereat is reduced. On the other hand, for a mobile terminal 50 that can suppress interference in only a small number of interfering radio wave beams, the amount of the channel characteristic information to be transmitted from the mobile terminal 50 may be increased. In this case, for the mobile terminal, precision of adjustment of interfering radio wave beams at the precoding characteristics calculator 30 of the radio base station 22 is improved.

Other Variations

In the above-described embodiments, channel impulse matrixes on the basis of reference signals are used for channel characteristics on downlinks from radio base stations to mobile terminals. However, other indexes, for example, signal-to-noise ratios or signal-to-interference ratios may be used instead of channel impulse matrixes.

In the above-described embodiments, the channel impulse parameters and precoding parameters are expressed by matrixes. However, at least one of these characteristics may be expressed by something other than a matrix, and the reception weights may be calculated by a mathematical scheme other than matrix calculation.

In the above-described embodiments, each mobile terminal 50 has an IRC function. However, the present invention can be applied to a radio communication system in which there are mobile terminals without an IRC function and mobile terminals with an IRC function.

Sectors may be provided for each radio base station 22. In each radio base station 22, the reception antenna 24 may also be used as one of the transmission antennas 44. In each mobile terminal 50, the transmission antenna 74 may also be used as one of the reception antennas 52.

In the radio base station 22 and the mobile terminal 50, functions executed by the CPU may be executed by hardware or a programmable logic device, such as an FPGA (Field Programmable Gate Array) or a DSP (Digital Signal Processor), instead of the CPU.

The above-described embodiments and modifications may be combined so long as no contradiction occurs. For example, the radio base stations 22 according to the first to the fourth embodiments may have a CS/CB function as well as an IA function. In other words, the precoding characteristics calculator 30 of the radio base station 22 may calculate precoding parameters, such that transmission antennas 44 direct main beams to destination mobile terminals 50 (connected to the radio base station 22) and direct nulling beams to other mobile terminals in cells of other radio base stations 22, and such that interfering radio wave beams to be transmitted to mobile terminals located in cells of other radio base stations 22 is in-phase added to interfering radio wave beams transmitted from yet other radio base stations for limiting the number of interfering radio wave beams that arrive at each mobile terminal. In addition, the radio base station may decide whether or not IA should be executed in accordance with the scheme described in conjunction with one of the first to the fourth embodiments, and may instruct the mobile terminal to adjust the amount of channel characteristic information to be sent from the mobile terminal in accordance with the scheme described in conjunction with the fifth or the sixth embodiment.

REFERENCE SYMBOLS

1: Desired Base Station
1a: Cell
2: Interfering Base Station
4: Mobile Terminal
5: Mobile Terminal
10: Core Network
20: Radio Access Network
22: Radio Base Station
2x: X2 Interface
23: Cell
24: Reception Antenna
26: Radio Receiver (Channel Characteristics Receiver)
28: IA (Interference Alignment) Decider
30: Precoding Characteristics Calculator (Inter-Base-Station Collaborator)
34: Modulator
36: Precoder
40: Resource Mapper
42: Radio Transmitter
44: Transmission Antennas
46: Inter-Base-Station Communicator (Inter-Base-Station Transmitter, Inter-Base-Station Receiver)
48: Channel-Characteristics-Adjustment Instructor
128: IA (Interference Alignment) Decider
50: Mobile Terminal
52: Reception Antennas
54: Radio Receiver
55: Interference Rejection Combining Processor
56: Signal Separator
58: Demodulator
60: Channel Estimator (Channel Characteristics Transmitter)
62: Interference-Suppression-Capability Calculator (Interference-Suppression-Capability-Information Transmitter)
70: SC-FDMA (Single-Carrier Frequency-Division Multiple Access) Modulator (Channel Characteristics Transmitter, Interference-Suppression-Capability-Information Transmitter)
72: Radio Transmitter (Channel Characteristics Transmitter, Interference-Suppression-Capability-Information Transmitter)
74: Transmission Antenna

The invention claimed is:

1. A radio communication system comprising multiple mobile terminals and multiple radio base stations communicating with the mobile terminals by radio,
each of the multiple mobile terminals comprising:
multiple reception antennas for receiving radio waves;
an interference rejection combining processor configured to give weights to multiple signals obtained by the multiple reception antennas so as to suppress interference with a desired radio wave beam from a desired radio base station caused by interfering radio wave beams from interfering base stations;
a signal separator configured to separate a signal destined for the mobile terminal from signals destined for other mobile terminals among signals derived from radio waves received at the multiple reception antennas with the use of the reception weights calculated at the interference rejection combining processor;
a channel estimator configured to calculate downlink channel characteristics from the multiple radio base stations to the mobile terminal;
a channel characteristics transmitter configured to impart, to the desired radio base station, channel characteristic information that indicates the channel characteristics calculated by the channel estimator; and
an interference-suppression-capability-information transmitter configured to impart, to the desired radio base station, interference-suppression-capability information on the number of interfering radio wave beams of which interference can be suppressed by the interference rejection combining processor, and each of the radio base stations comprising:
- multiple transmission antennas for transmitting radio waves on which signals destined for mobile terminals are carried;
- a channel characteristics receiver configured to receive, from a mobile terminal for which a desired radio base station is the radio base station, channel characteristic information that indicates the channel characteristics;
- an interference-suppression-capability-information receiver configured to receive interference-suppression-capability information from the mobile terminal for which a desired radio base station is the radio base station;
- an inter-base-station transmitter configured to transmit the channel characteristic information received at the channel characteristics receiver to other multiple radio base stations;
- an inter-base-station receiver configured to receive, from other multiple radio base stations, channel characteristic information for mobile terminals for which desired radio base stations are said other multiple radio base stations; and
- an inter-base-station collaborator configured to give weights to the radio waves to be transmitted from the multiple transmission antennas, on the basis of channel characteristic information that indicates channel characteristics for multiple mobile terminals received at the channel characteristics receiver and the inter-base-station receiver, so as to perform in-phase addition of an interfering radio wave beam directed to a mobile terminal for which the desired radio base station is another radio base station to an interfering radio wave beam transmitted from yet another radio base station for limiting the number of interfering radio wave beams that arrive at the mobile terminal,
- wherein the inter-base-station collaborator is configured to give weights to the radio waves to be transmitted from the multiple transmission antennas, depending on the number of interfering radio wave beams of which interference can be suppressed by the mobile terminal for which the desired radio base station is said another radio base station.

2. The radio communication system according to claim 1, wherein the inter-base-station collaborator of each of the radio base stations is configured not to conduct the in-phase addition when the number of interfering radio wave beams of which interference can be suppressed by said mobile terminal for which the desired radio base station is said another radio base station is equal to or greater than the number of radio base stations that would be able to send interfering radio wave beams to said mobile terminal, and wherein the inter-base-station collaborator is configured to conduct the in-phase addition when the number of interfering radio wave beams of which interference can be suppressed by said mobile terminal for which the desired radio base station is said another radio base station is less than the number of radio base stations that would be able to send interfering radio wave beams to said mobile terminal.

3. A radio communication system comprising multiple mobile terminals and multiple radio base stations communicating with the mobile terminals by radio,
each of the multiple mobile terminals comprising:
- multiple reception antennas for receiving radio waves;
- an interference rejection combining processor configured to give weights to multiple signals obtained by the multiple reception antennas so as to suppress interference with a desired radio wave beam from a desired radio base station caused by interfering radio wave beams from interfering base stations;
- a signal separator configured to separate a signal destined for the mobile terminal from signals destined for other mobile terminals among signals derived from radio waves received at the multiple reception antennas with the use of the reception weights calculated at the interference rejection combining processor;
- a channel estimator configured to calculate downlink channel characteristics from the multiple radio base stations to the mobile terminal;
- a channel characteristics transmitter configured to impart, to the desired radio base station, channel characteristic information that indicates the channel characteristics calculated by the channel estimator; and
- an interference-suppression-capability-information transmitter configured to impart, to the desired radio base station, interference-suppression-capability information on the number of interfering radio wave beams of which interference can be suppressed by the interference rejection combining processor, and each of the radio base stations comprising:
- multiple transmission antennas for transmitting radio waves on which signals destined for mobile terminals are carried;
- a channel characteristics receiver configured to receive, from a mobile terminal for which a desired radio base station is the radio base station, channel characteristic information that indicates the channel characteristics;
- an interference-suppression-capability-information receiver configured to receive interference-suppression-capability information from the mobile terminal for which a desired radio base station is the radio base station;
- an inter-base-station transmitter configured to transmit the channel characteristic information received at the channel characteristics receiver to other multiple radio base stations;
- an inter-base-station receiver configured to receive, from other multiple radio base stations, channel characteristic information for mobile terminals for which desired radio base stations are said other multiple radio base stations;
- an inter-base-station collaborator configured to give weights to the radio waves to be transmitted from the multiple transmission antennas, on the basis of channel characteristic information that indicates channel characteristics for multiple mobile terminals received at the channel characteristics receiver and at the inter-base-station receiver, so as to adjust a desired radio wave beam to a mobile terminal for which a desired radio base station is the radio base station and an interfering radio wave beam to another mobile terminal for which a desired radio base station is another radio base station; and
- a channel-characteristics-adjustment instructor configured to instruct, on the basis of the interference-suppression-capability information received at the interference-suppression-capability-information receiver, each of the mobile terminals to adjust an amount of the channel characteristic information to be transmitted from the mobile terminal.

4. The radio communication system according to claim 3, wherein the channel-characteristics-adjustment instructor is configured to instruct each of the mobile terminals to adjust an amount of the channel characteristic information to be transmitted from the mobile terminal, such that the greater the number of interfering radio wave beams of which interference can be suppressed by the mobile terminal, the smaller the amount of the channel characteristic information to be transmitted from the mobile terminal.

5. A radio base station communicating with mobile terminals by radio and communicating with other multiple radio base stations, comprising:
multiple transmission antennas for transmitting radio waves on which signals destined for mobile terminals are carried;
a channel characteristics receiver configured to receive, from a mobile terminal for which a desired radio base station is the radio base station, channel characteristic information that indicates downlink channel characteristics from the radio base station and other radio base stations;
an interference-suppression-capability-information receiver configured to receive interference-suppression-capability information from the mobile terminal for which a desired radio base station is the radio base station, the interference-suppression-capability information being related to the number of interfering radio wave beams of which interference can be suppressed by the mobile terminal;
an inter-base-station transmitter configured to transmit the channel characteristic information received at the channel characteristics receiver to other multiple radio base stations;
an inter-base-station receiver configured to receive, from other multiple radio base stations, channel characteristic information for mobile terminals for which desired radio base stations are said other multiple radio base stations; and
an inter-base-station collaborator configured to give weights to the radio waves to be transmitted from the multiple transmission antennas, on the basis of channel characteristic information that indicates channel characteristics for multiple mobile terminals received at the channel characteristics receiver and the inter-base-station receiver, so as to perform in-phase addition of an interfering radio wave beam directed to a mobile terminal for which the desired radio base station is another radio base station to an interfering radio wave beam transmitted from yet another radio base station for limiting the number of interfering radio wave beams that arrive at the mobile terminal,
wherein the inter-base-station collaborator is configured to give weights to the radio waves to be transmitted from the multiple transmission antennas, depending on the number of interfering radio wave beams of which interference can be suppressed by the mobile terminal for which the desired radio base station is said another radio base station.

6. The radio base station according to claim 5, wherein the inter-base-station collaborator is configured not to conduct the in-phase addition when the number of interfering radio wave beams of which interference can be suppressed by said mobile terminal for which the desired radio base station is said another radio base station is equal to or greater than the number of radio base stations that would be able to send interfering radio wave beams to said mobile terminal, and wherein the inter-base-station collaborator is configured to conduct the in-phase addition when the number of interfering radio wave beams of which interference can be suppressed by said mobile terminal for which the desired radio base station is said another radio base station is less than the number of radio base stations that would be able to send interfering radio wave beams to said mobile terminal.

7. A radio base station communicating with mobile terminals by radio and communicating with other multiple radio base stations, comprising:
multiple transmission antennas for transmitting radio waves on which signals destined for mobile terminals are carried;
a channel characteristics receiver configured to receive, from a mobile terminal for which a desired radio base station is the radio base station, channel characteristic information that indicates downlink channel characteristics from the radio base station and other radio base stations;
an interference-suppression-capability-information receiver configured to receive interference-suppression-capability information from the mobile terminal for which a desired radio base station is the radio base station, the interference-suppression-capability information being related to the number of interfering radio wave beams of which interference can be suppressed by the mobile terminal;
an inter-base-station transmitter configured to transmit the channel characteristic information received at the channel characteristics receiver to other multiple radio base stations;
an inter-base-station receiver configured to receive, from other multiple radio base stations, channel characteristic information for mobile terminals for which desired radio base stations are said other multiple radio base stations; and
an inter-base-station collaborator configured to give weights to the radio waves to be transmitted from the multiple transmission antennas, on the basis of channel characteristic information that indicates channel characteristics for multiple mobile terminals received at the channel characteristics receiver and at the inter-base-station receiver, so as to adjust a desired radio wave beam to a mobile terminal for which a desired radio base station is the radio base station and an interfering radio wave beam to another mobile terminal for which a desired radio base station is another radio base station; and
a channel-characteristics-adjustment instructor configured to instruct, on the basis of the interference-suppression-capability information received at the interference-suppression-capability-information receiver, each of the mobile terminals to adjust an amount of the channel characteristic information to be transmitted from the mobile terminal.

8. The radio base station according to claim 7, wherein the channel-characteristics-adjustment instructor is configured to instruct each of the mobile terminals to adjust an amount of the channel characteristic information to be transmitted from the mobile terminal, such that the greater the number of interfering radio wave beams of which interference can be suppressed by the mobile terminal, the smaller the amount of the channel characteristic information to be transmitted from the mobile terminal.

9. A mobile terminal comprising:
multiple reception antennas for receiving radio waves;
an interference rejection combining processor configured to give weights to multiple signals obtained by the multiple reception antennas so as to suppress interference with a desired radio wave beam from a desired radio base station caused by interfering radio wave beams from interfering base stations;
a signal separator configured to separate a signal destined for the mobile terminal from signals destined for other mobile terminals among signals derived from radio waves received at the multiple reception antennas with the use of the reception weights calculated at the interference rejection combining processor;
a channel estimator configured to calculate downlink channel characteristics from multiple radio base stations to the mobile terminal;
a channel characteristics transmitter configured to impart to the desired radio base station, channel characteristic information that indicates the channel characteristics calculated by the channel estimator; and
an interference-suppression-capability-information transmitter configured to impart, to the desired radio base station, interference-suppression-capability information that indicates the number of interfering radio wave beams of which interference can be suppressed by the interference rejection combining processor,
wherein the interference-suppression-capability-information transmitter is configured to calculate the number of interfering radio wave beams of which interference can be suppressed on the basis of the number of the reception antennas of the mobile terminal and a number of transmission streams of the signal destined for the mobile terminal from the desired base station.

10. The mobile terminal according to claim 9, wherein the channel estimator or the channel characteristics transmitter is configured to adjust an amount of the channel characteristic information to be transmitted from the mobile terminal in accordance with an instruction from the desired base station.

* * * * *